(12) United States Patent
Vorontsov

(10) Patent No.: US 12,266,898 B2
(45) Date of Patent: Apr. 1, 2025

(54) METHODS AND DEVICES FOR LASER POWER PROJECTION ON A REMOTE TARGET WITH COHERENT FIBER ARRAY AND ADAPTIVE BEAM CONTROL

(71) Applicant: II-VI Delaware, Inc., Wilmington, DE (US)

(72) Inventor: Mikhail A Vorontsov, Spring Valley, OH (US)

(73) Assignee: II-VI DELAWARE, INC., Wilmington, DE (US)

( * ) Notice: Subject to any disclaimer, the term of this patent is extended or adjusted under 35 U.S.C. 154(b) by 1079 days.

(21) Appl. No.: 17/249,102

(22) Filed: Feb. 19, 2021

(65) Prior Publication Data
US 2022/0352686 A1   Nov. 3, 2022

(51) Int. Cl.
| H01S 3/10 | (2006.01) |
| H01S 3/067 | (2006.01) |
| H01S 3/1055 | (2006.01) |
| H01S 3/13 | (2006.01) |
| H01S 3/23 | (2006.01) |

(52) U.S. Cl.
CPC ...... *H01S 3/06712* (2013.01); *H01S 3/10053* (2013.01); *H01S 3/10061* (2013.01); *H01S 3/1055* (2013.01); *H01S 3/1307* (2013.01); *H01S 3/2308* (2013.01)

(58) Field of Classification Search
CPC ............. H01S 3/06712; H01S 3/10053; H01S 3/10061; H01S 3/1055; H01S 3/1307; H01S 3/2308; H01S 3/06704; H01S 3/2383; H01S 3/06754; H01S 3/1301; H01S 3/1305; H01S 3/1308; F41H 13/005

See application file for complete search history.

(56) References Cited

U.S. PATENT DOCUMENTS

| 6,575,574 | B2 | 6/2003 | DellaVecchia et al. |
| 6,648,473 | B2 | 11/2003 | DellaVecchia et al. |
| 6,911,637 | B1 | 6/2005 | Vorontsov et al. |
| 7,197,248 | B1 | 3/2007 | Vorontsov et al. |
| 7,226,166 | B2 | 6/2007 | Della Vecchia et al. |
| 7,377,647 | B2 | 5/2008 | Della Vecchia et al. |
| 7,967,456 | B2 | 6/2011 | Beresnev et al. |
| 8,503,837 | B2 | 8/2013 | Beresnev et al. |
| 8,611,691 | B2 | 12/2013 | Vorontsov et al. |
| 9,134,538 | B1* | 9/2015 | Augst .................. H01S 5/4062 |
| 10,589,377 | B2 | 3/2020 | Vorontsov |
| 10,630,043 | B1 | 4/2020 | Vorontsov et al. |
| 2002/0074631 | A1* | 6/2002 | Sato .................... H01S 5/18311 257/676 |
| 2004/0165147 | A1 | 8/2004 | Della Vecchia et al. |
| 2005/0201429 | A1* | 9/2005 | Rice ..................... H01S 3/2383 372/27 |
| 2011/0025919 | A1 | 2/2011 | Vorontsov et al. |
| 2013/0215527 | A1 | 8/2013 | Beresnev et al. |

(Continued)

*Primary Examiner* — Xinning(Tom) Niu
(74) *Attorney, Agent, or Firm* — Blank Rome LLP

(57) ABSTRACT

A coherent fiber array laser power projection system scalable to large number of subapertures and includes sensors that produce signals dependent upon beam characteristics, and controllers configured to control beam characteristics to achieve either phasing of outgoing beams at transmitter plane or coherent beam combining at a remote target or both.

20 Claims, 32 Drawing Sheets

(56) References Cited

U.S. PATENT DOCUMENTS

2014/0231618 A1* 8/2014 Beresnev ........... G02B 27/0087
250/201.9
2020/0366048 A1 11/2020 Vorontsov et al.
2021/0101823 A1* 4/2021 Goodno ................ C03B 37/15
2021/0103153 A1* 4/2021 Goodno ............. H01S 3/06754

* cited by examiner

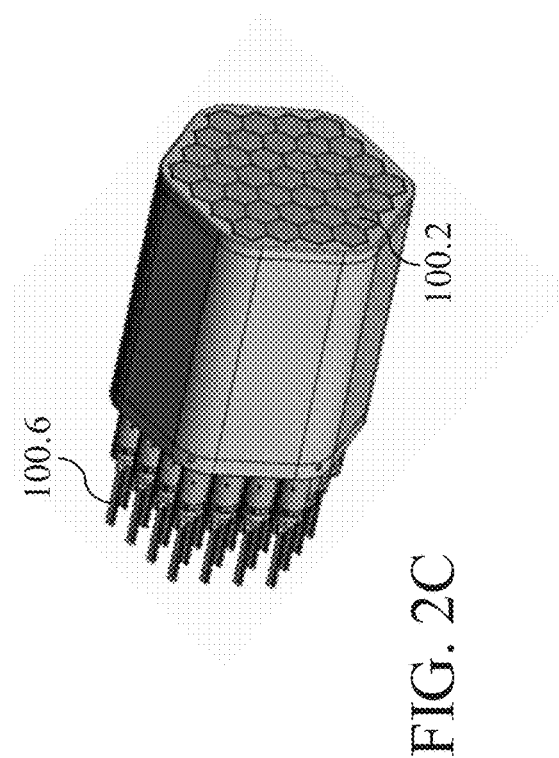
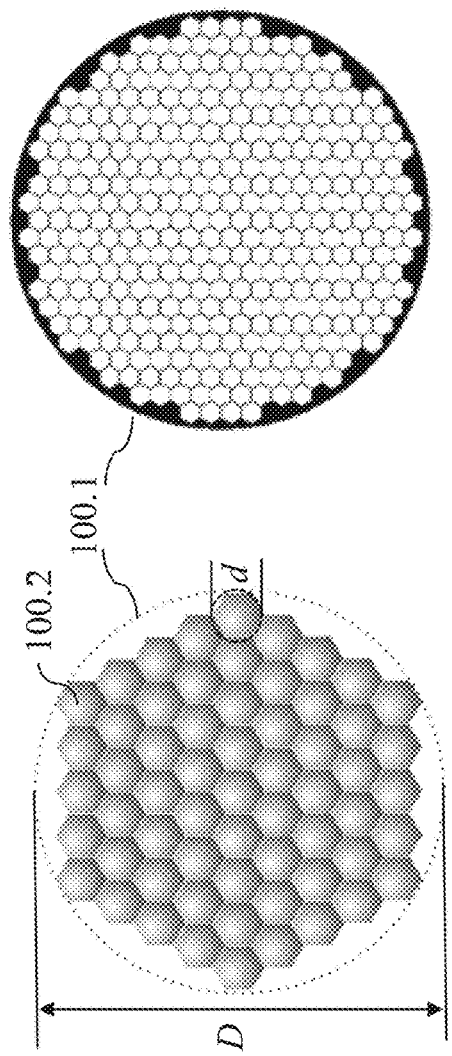
FIG. 2C
FIG. 2D
FIG. 2E

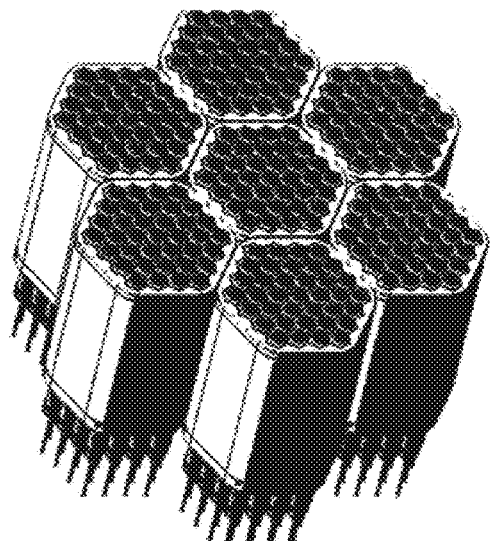
FIG. 3B
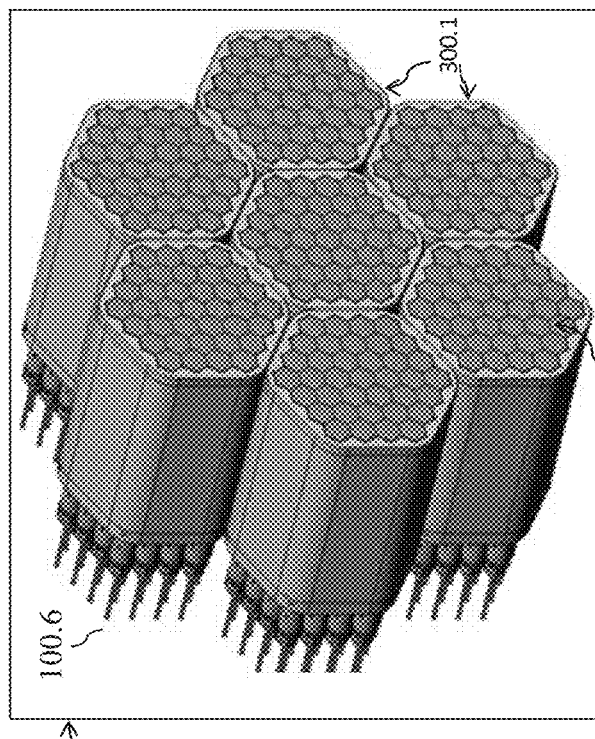
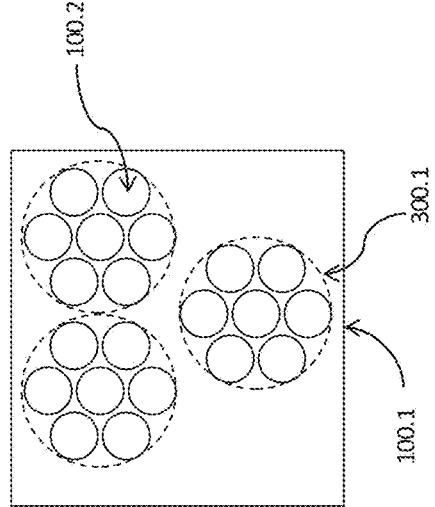
FIG. 3A
(Prior Art)

METHODS AND DEVICES FOR LASER POWER PROJECTION ON A REMOTE TARGET WITH COHERENT FIBER ARRAY AND ADAPTIVE BEAM CONTROL

FIELD

The disclosed technology pertains to systems for high laser power projection on a remotely located target.

BACKGROUND

There are a number of optical system types for which performance depends on efficient projection of a laser beam, or an array of beams, through optically inhomogeneous media such as the Earth's atmosphere, air boundary layers near the surface of a flying aircraft, or air flows resulting from deposition of a laser beam or other power source onto a work-piece during material processing. Examples of these system types include: (a) directed energy ("DE") high power laser systems used to concentrate laser beam power within a small area, commonly referred to as a focal spot or a target "hit-spot" area, in order to induce thermal and/or material modification effects at a remotely located target; (b) industrial laser processing systems that use a high power laser energy source for material processing in metals; (c) optical power beaming systems that deliver laser beam power onto a remotely located optical-to-electrical power converter that generates electrical power as a result of laser beam illumination; and (d) active imaging systems that use laser power to illuminate a remotely located target. Performance and efficiency of some optical systems, such as those described above, can be improved using the technology described herein and variations thereof.

High power ("HP") laser beam projection systems, often referred to as laser directed energy ("DE") systems, are considered important aspects of current and future technology that can provide efficient and economical solutions for critical defense and homeland security missions including defense of military platforms against various threats, remote demolition of objects in contaminated areas, and removal of space debris with a ground based DE laser system, for example. Directed energy laser systems may also be used for laser material processing such as remote welding, paint removal, metallic sheet cutting, and delivering laser beam power to a remotely located optical-to-electrical (O-E) power converter used, for example, for providing operational power or charging batteries at difficult to reach locations (e.g., an airborne or space-surveillance platform, seaborne platforms or devices).

Efficiency of these laser beam projection systems depends on the ability to generate and maintain a laser focal spot with high power density within a designated region (e.g., an aimpoint region). Correspondingly, it may be desirable to provide the capability for scaling of laser power to tens and even hundreds of kilowatts ("kWs") without sacrificing laser beam(s) quality, since such quality influences a system's ability to optimally concentrate laser power at the aimpoint region. When described herein, laser systems with a power level from several to tens of kilowatts may be referred to as high power ("HP"), while laser systems with above 100 kW power level may be referred to as extremely high power ("EHP") laser systems.

Laser beam quality and power scaling issues. The quality of a laser beam is commonly characterized by an $M^2$ number, where $M^2=1$ corresponds to the beam of highest quality, also known as a diffraction-limited beam having the smallest possible divergence. Laser beams with $M^2<1.1$ are considered as near diffraction-limited quality beams. In conventional DE systems, such as high energy laser ("HEL") systems that utilize a single high power laser source, an increase of laser power up to and approximately above 5-10 kW and higher is accompanied by deterioration of beam quality leading to parameter $M^2$ increase. As a result, such HEL DE technology cannot provide scaling of laser power to tens and/or hundreds of kW while preserving near diffraction-limited HEL beam quality. The technology disclosed herein, and variations thereof, may be implemented to produce DIE systems capable of upwards scaling laser power while preserving beam quality at near diffraction-limited levels.

Conventional adaptive optics shortcomings. In beam projection applications such as those mentioned above, it is advantageous for DIE laser systems to be capable of adaptive mitigation of the negative impact of optical inhomogeneities on laser beam characteristics, Such optical inhomogeneities may be either situationally present (e.g., due to atmospheric turbulence and/or mechanical and acoustical jitter), or may be self-induced by a HP or EHP laser beam (e.g. due to thermal blooming effects). Optical inhomogeneities can cause aberrations of laser beam wavefront phase and may influence or result in undesirable effects inside the aimpoint (focal spot) region, such as focal spot widening, wandering, and strong irradiance (intensity) fluctuations (scintillations). Propagation medium-induced effects represent one of the major problems for achieving the highest possible laser power density at the target aimpoint (hit-spot) region. In current HEL DE systems that utilize beam forming telescopes (beam directors), including those with monolithic optics such as Cassegrain or off-axis type telescopes, mitigation of propagation-medium-induced phase aberrations may be achieved using conventional adaptive optics ("AO") techniques based on electro-mechanical deformable mirrors ("DMs"). One or several DMs that are located in an optical train of a DE system may have relatively small (e.g., typically not exceeding 5 cm-10 cm) diameter(s), and thus are exposed to extremely high laser power density. These DMs are expensive and are not configured to withstand laser power scaling up to and above 100 kW without negatively impacting performance and/or longevity. At the same time, increasing a DM's size to decrease power density would increase system cost, size, and complexity. Additionally, the characteristic response time (e.g., on the order of 100 μsec or longer) of current DMs is not sufficient for mitigation of rapidly changing phase aberrations, such as aberrations associated with laser beam projection towards a fast-moving target within or through the Earth's atmosphere. These and other shortcomings of conventional AO technology may be resolved by implementations of the disclosed technology and variations thereof and may enable an alternative HEL DE approach that utilizes the disclosed coherent fiber array beam projection system architectures and novel AO control algorithms.

SUMMARY OF THE INVENTION

The inventor has conceived of sensing arrangements that, for the purpose of illustration, is disclosed herein as applied in the context of: projection of high power laser beams on a remote target in the atmosphere, and adaptive optics ("AO") mitigation of platform vibration and atmospheric turbulence-induced effects for directed energy and power beaming applications. While the disclosed applications of the inventor's technology satisfy a long-felt but unmet need in the art of atmospheric DE and power beaming applications, it should be understood that the inventor's technology is not limited to being implemented in the precise manners set forth herein, but could be implemented in other manners and to other beam projection applications such as mentioned above without undue experimentation by those of ordinary skill in the art in light of this disclosure. Accordingly, the examples set forth herein should be understood as being illustrative only and should not be treated as limiting.

The systems and methods disclosed herein enable the possibility for upwards laser power scaling in coherent fiber array laser systems up to tens and potentially hundreds of kW with both preservation of near diffraction-limited beam quality and adaptive mitigation of the negative impacts of propagation-medium-induced phase aberrations and environmental factors-induced vibrations.

BRIEF DESCRIPTION OF THE DRAWINGS

The drawings and detailed description that follow are intended to be merely illustrative and are not intended to limit the scope of the invention as contemplated by the inventor.

FIGS. 2A-2E each illustrates different configurations of fiber array laser head.

FIGS. 3A and 3B each illustrate of a fiber array laser head including multiple fiber array assemblies (clusters).

DETAILED DESCRIPTION

Figure 1:
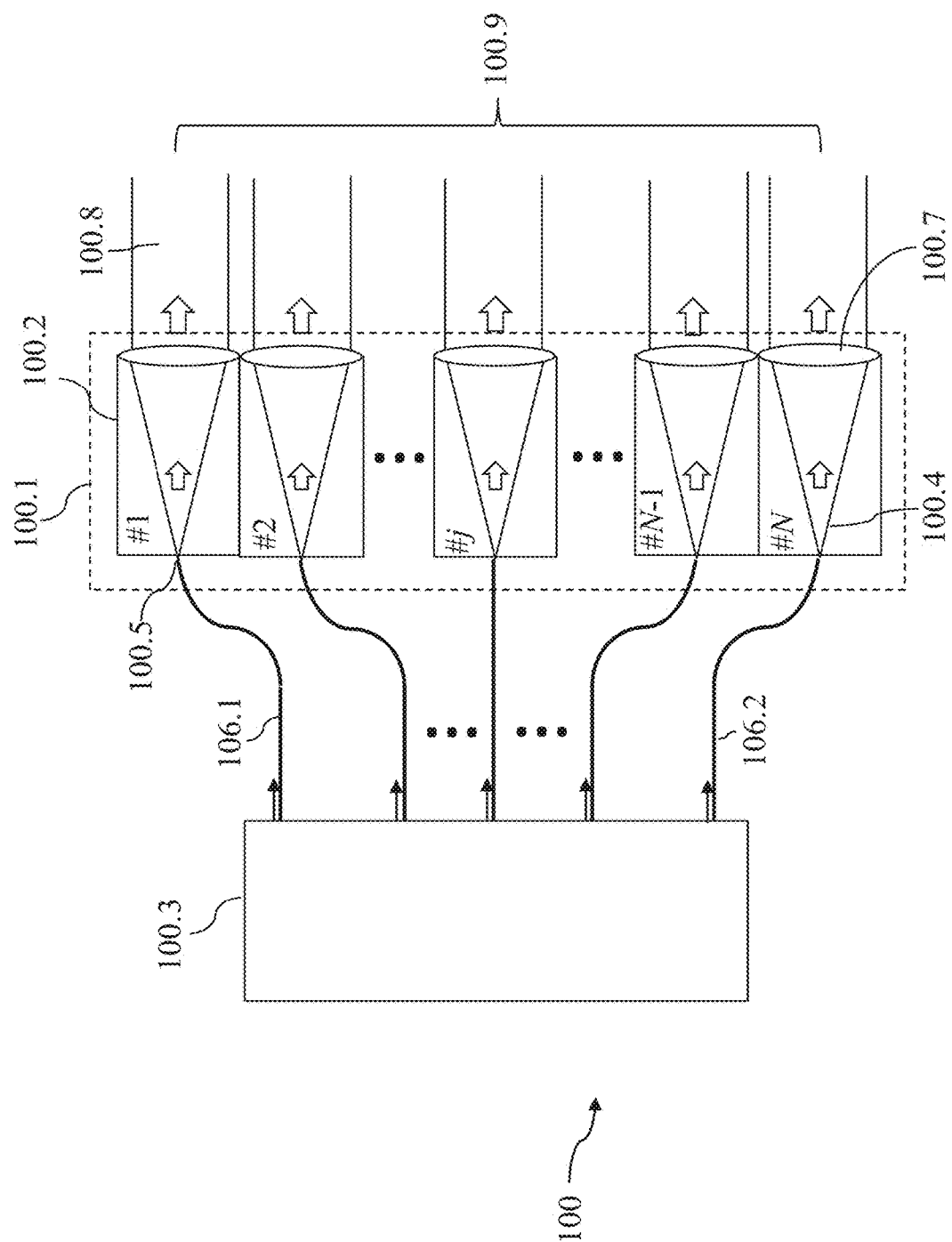
FIG. 1 is a schematic diagram of a fiber array laser system of the prior art.

Fiber array laser systems: background, prior art and definitions. A notional schematic of a fiber array laser system of the prior art is illustrated in FIG. 1. The system (100) is composed of an array (100.1) of N densely packed laser transmitters (100.2), also referred to as fiber array subapertures, and a multi-beam fiber laser source (100.3). The laser transmitter array (100.1) is also known as the fiber array laser head. Several examples of fiber array laser heads with subapertures in varying numbers, shapes, and arrangements are additionally illustrated in FIGS. 2A through 2E. As an example, the number of subapertures (100.2) is N=7 in FIG. 2A and FIG. 2B, as may be typical. Increased scaling can give additional examples having a subaperture numbers N=37 in FIG. 2C, N=61 in FIG. 2D, and N=313 in FIG. 2E. Laser beams (100.4) enter the laser head (100.1) through the tips (100.5) of the N delivery fibers (106.1) connecting the laser head (100.1) with a multi-beam fiber laser source (100.3). The fiber tips (100.5) are located at the focuses of the beam forming optical systems (e.g. collimating lenses) (100.7) inside the laser transmitters (100.2). The beam forming optical systems form an array of collimated laser beams (100.8), also known as a combined beam (100.9). The combined beam (100.9) is projected to the target.

Figure 4:
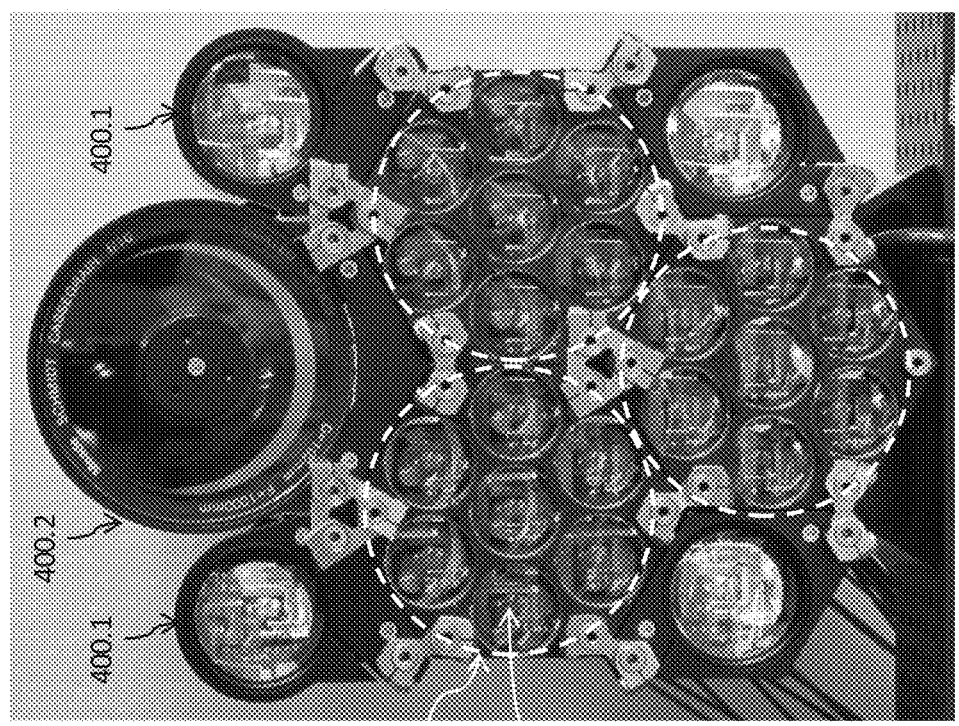
FIG. 4 is a front elevation view of a fiber array laser head of the prior art with sensing modules.

In some implementations, the fiber array laser head (100.1) can be composed of one or more fiber array assemblies or clusters (300.1) with a smaller number of subapertures, as shown in FIGS. 3A-3B. While FIG. 3A shows a fiber array laser head (100.1) typical of the prior art having three fiber array clusters (300.1) composed on seven subapertures (100.2), the precise number of subapertures and the number of fiber array clusters may vary based upon such factors as price, desired size and desired capabilities of the laser system and other factors. The fiber array laser heads (100.1) could have integrated sensing and/or imaging modules that are used for receiving backscatter signal from the target. An example in the prior art is illustrated in FIG. 4, which shows the laser head (100.1) with three fiber array clusters (300.1) having seven subapertures each, four power-in-the-bucket (PIB) sensing modules (400.1) and one imaging sensor (400.2) used for target tracking and combined beam (100.9) pointing. As an example of scaling to more clusters that are densely packed, FIG. 33 shows a perspective view of another fiber array laser head system composed of more (seven) fiber array clusters (300.1) with even more (37) densely-packed fiber-based laser transmitters (100.2) in each cluster, for a total of 259 subapertures. Implementation of the disclosed EHP-class fiber array systems may require scalability of fiber arrays to a very high number of subapertures, which can be accomplished with the system architectures and control methods disclosed herein, and variations thereof, which offer solutions to the problem of laser power upwards scaling in HP fiber array systems as well as other problems present in many conventional systems.

Power-per-fiber: considerations and limitations. With fiber array technology, transmitted laser power can potentially be scaled up to and above 100 kWs by either increasing the laser power $p_{sub}$ transmitted through each subaperture (100.2), or increasing the number of subapertures N, or both. Each of these approaches has its own limitations. The increase of power $p_{sub}$ is limited by the presence of nonlinear effects in fibers, such as for example stimulated Brillion scattering ("SBS") and thermal modal instability (TMI), which accompany high-power laser beam propagation inside a fiber. At laser power levels exceeding a threshold value $p_{NL}$ nonlinear effects could lead to serious fiber material damage or failure of other modules and the fiber-elements. The threshold power $p_{NL}$ is different for multi-mode and single mode fiber types. For multi-mode fibers having significantly higher threshold power values $p_{NL}$, the laser power delivered through each fiber (power-per-fiber $p_{fiber}$) may exceed $p_{fiber}$ ~10 kW-20 kW vs $p_{fiber}$ ~1.5 kW-3 kW for typical single-mode fibers. Nevertheless, because of low beam quality and the correspondingly large divergence of laser beams emitted through the multi-mode fibers, single-mode fibers are used in practical HP fiber array DE systems.

Clipped laser power and related thermal management issues. Single-mode fibers provide good quality (e.g. $M^2$ <1.1) Gaussian-shape laser beams ("beamlets") that are delivered to the fiber transmitters (100.2) of the laser head (100.1). A relatively small, typically ~ 5%-7%, portion $\gamma_{clipp}$ of the beamlet's power is clipped by the laser transmitters' (100.2) optical elements of the beam forming optical system (100.7) and partially absorbed inside the laser head (100.1) resulting in heat-induced thermo-mechanical deformations of components causing optical and other fiber array laser head element misalignment or even damage. With the desired fiber array system power scaling up to hundreds of kWs the total clipped power $P_{clip}$~$N \gamma_{clipp} p_{fiber}$ could be on the order of several kWs. Being confined inside the fiber array laser head, such high clipped laser power could result in unacceptably strong mechanical deformation and even damage of the fiber array laser head. In addition to the clipped laser power, high power fiber amplifiers may emit a portion of the laser power through the fiber cladding. This, referred to as cladding laser light, has wider divergence and, similar to the clipped light of the transmitted through fiber tips Gaussian beams (100.4), may be partially absorbed inside the laser head (100.1).

Figure 2B:
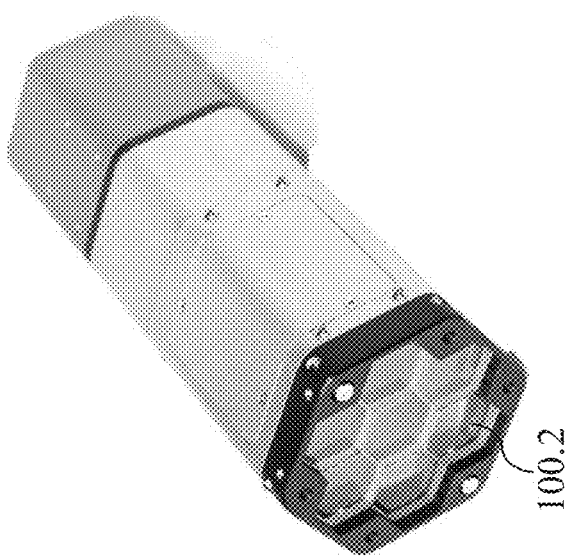
Figure 2A:
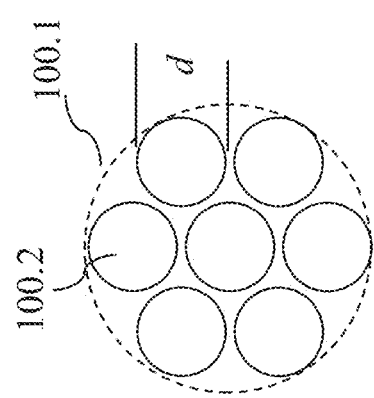

HP and EHP laser head: consideration and challenges. Divergent Gaussian beams (100.4) emitted through fiber tips (100.5) are transformed inside the laser transmitters (100.2) of the laser head (100.1) into truncated (clipped) collimated beams (100.8) of diameter d (subaperture diameter). In the case of non-circular shape subapertures (e.g. hexagonal as in FIG. 2B through FIG. 2E) the parameter d describes a circumscribed subaperture circuit diameter. Commonly the subaperture diameter d in conventional fiber array systems as in FIG. 2B and FIG. 4 is on the order of 3.0 cm-5.0 cm. The selection of the subaperture diameter d in the HP and EHP fiber array systems may be influenced by several considerations and constraints. Because of nonlinear effects-induced limitations on the power-per-fiber $p_{fiber}$, significant increase of laser power in single-mode-based HP and EHP fibers systems can only be achieved via an increase of the number N of fiber array subapertures. As an estimation of N and overall (circumscribed) laser head aperture diameter D, consider an EHP-class fiber array system composed of densely packed hexagonal shape subapertures, such as shown in FIG. 2B through FIG. 2E with transmitted total power $P_{Array}$ equal or above 200 kW. With the exemplary parameters for subaperture diameter d=3 cm, power-per-fiber $p_{fiber}$ not exceeding 1.5 kW, and power clipping parameter $\gamma_{clipp}$=0.05, an exemplary fiber array should contain N=128 or more subapertures. It is apparent from known geometrical considerations that the aperture diameter of this fiber array would be as large as D=13d=39 cm or greater. Further increase of laser power could require an EPH fiber array laser head with even large overall size resulting in heavy, bulky, and expensive systems with limited capabilities for pointing of the transmitted combined beam. From this viewpoint decrease of subaperture diameter d is appealing as it results in more compact, lighter, and less expensive HP and EHP fiber array laser head systems. At the same time, a small subaperture size leads to more challenging problems with mitigation of thermal effects caused by clipped laser power contained in a smaller-volume laser head assembly.

Fiber array phasing: background and definitions. Reduction of fiber array subaperture size results in some other implications that should be considered. The subaperture diameter d defines divergence of the beamlets (100.8) emitted by the fiber array laser head. For propagation in an optically homogeneous medium, the angular divergence is proportional to $\lambda/d$, where $\lambda$ is laser wavelength. Correspondingly, a decrease of d results in additional spread and beam footprint enlargement at the target plane with proportional to d 2 decline in target focal spot or hit-spot power density. From this viewpoint, a decrease of subaperture diameter d is undesirable unless all beamlets are mutually phased at the fiber array pupil plane.

Ideal phasing, also known as phase locking of beamlets having co-aligned polarization states and nearly identical optical carrier frequencies, is defined by the condition $\mod_{2\pi}(\Delta_j-\Delta_k)=0$, where j, k=1, . . . , N, and $\Delta_j$ and $\Delta_k$ are subaperture-averaged wavefront phases, also referred to as piston phases. The beamlet's pupil plane phasing is also known as near-field phase locking, as opposite to far-field or target-plane phasing, which requires mutual phasing of beamlets at the target aimpoint vicinity. With near-field phase locking of fiber array subapertures (100.2), the divergence of the combined fiber array laser beam (100.9) decreases by the ratio d/D in comparison with the case when beamlets are un-phased or mutually incoherent, Correspondingly, for propagation in an optically homogeneous medium the near-field phasing provides significant (e.g., approximately by factor of $(D/d)^2$ enhancement of laser power density inside the target hit-spot. Current near-field phasing technologies, as discussed below, cannot support scaling to a high number of subapertures in order to provide transitioning towards EHP-class fiber arrays systems. The methods and devices disclosed herein, and variations thereof, are capable of such scaling for both the number of subapertures and laser power.

Master-oscillator-power-amplifier MOPA) system, Fiber array phasing either at the pupil (near-field phasing) or at the target (target-plane phasing) planes uses a multi-beam laser source (100.3) of a special type known as a master-oscillator-power-amplifier (MOPA) fiber laser system. The MOPA system with control modules is configured for laser power delivery to the fiber array laser head, as well as for adaptive control of subaperture piston phases utilized for phase locking and mitigation of turbulence-Induced aberrations. The MOPA system may also be configured to co-align the polarization states of the emitted beamlets, equalize optical carrier frequency in all fiber channels, control beamlet power to some or all of them, or all above, A schematic of an exemplary MOPA fiber system (500) is shown in FIG. 5, A fiber array system that includes MOPA and fiber array laser head (100.1) is commonly referred to as a coherent, or coherently combinable, fiber array system, if the beamlets of this system can be phased either at the fiber array laser head pupil or target.

Figure 5:
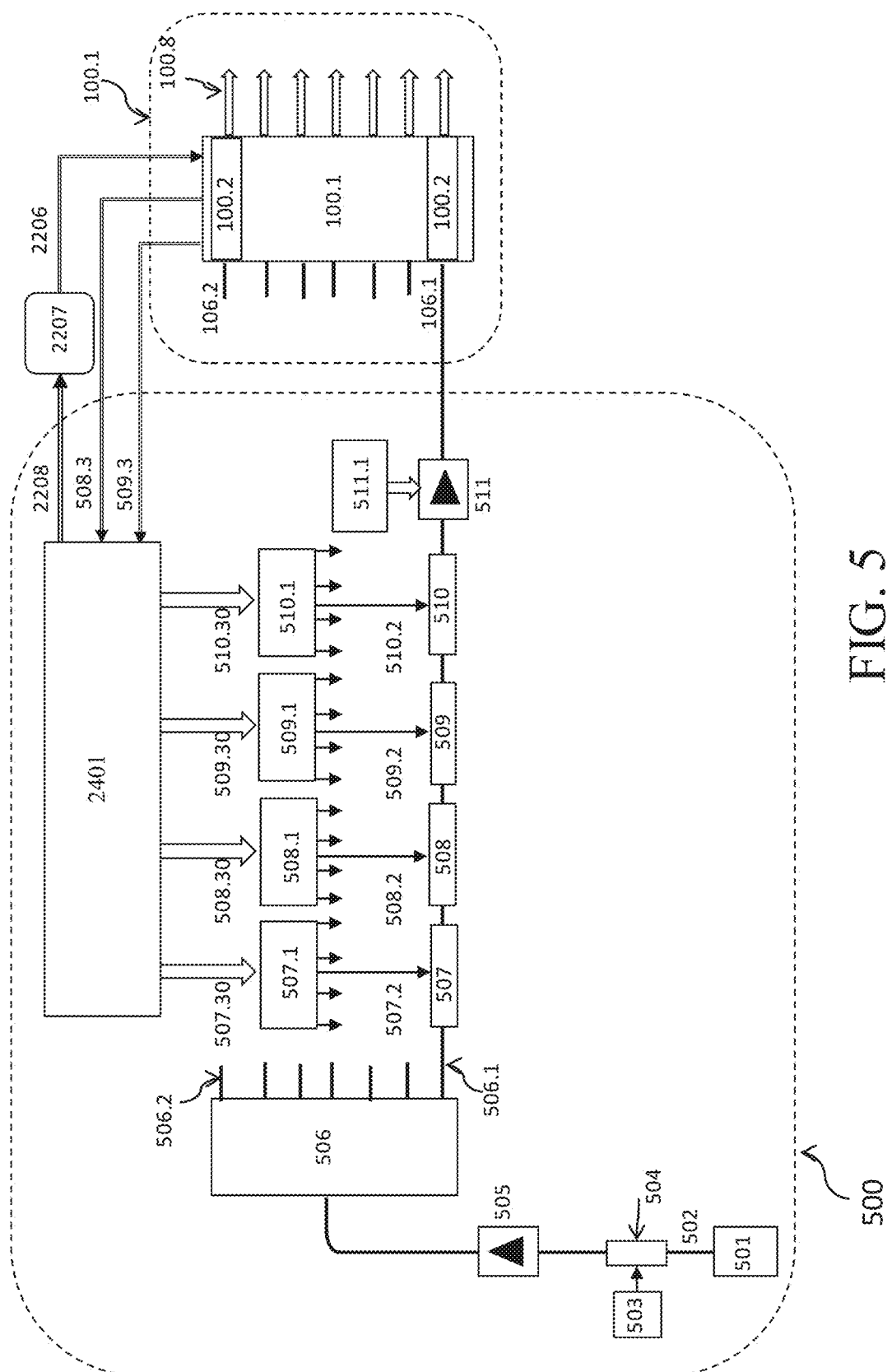
FIG. 5 is a schematic diagram of an exemplary master oscillator power amplifier (MOPA) system illustrating the present disclosure.

In the MOPA system (500) in FIG. 5, a laser beam from a narrow linewidth seed laser (501) is coupled into a single-mode fiber (502) that delivers a Gaussian beam into a set of fiber splitters (506) that nearly equally divide the input beam between N single-mode fiber channels from #1 (506.1) to #N (506.2). The number of fiber channels corresponds to the number of beams (100.4) that are transmitted by the fiber array laser head (100.1). Prior to splitting into fiber channels, the laser beam may be modulated in phase to increase linewidth and, thus, mitigate nonlinear effects in fibers. This laser beam linewidth increase is also known as line broadening and may be achieved using a special electronic module (503) that supplies a high frequency random signal to a fiber-integrated phase modulator (504). The line broadened frequency is typically on the order of 15-30 GHz for fiber array systems with powers-per-fiber $p_{fiber}$ ranging between 1.0 kW and 3 kW. Right before (or after) the line broadening module (504) the beam may be amplified by a fiber pre-amplifier (505). All fiber channels of the MOPA fiber system (500) in FIG. 5 may be composed of identical or nearly identical fiber-integrated components. For this reason, the embodiment of FIG. 5 only shows the fiber-integrated components for a single fiber channel #1 (506.1).

After being split into N channels by the fiber splitters (506), each laser beam passes through a set of controllable elements that modulate one or another characteristic of the laser beams propagating in the fiber channels. This may include, for example, (a) adjusters of optical path length differences (OPLDs) (507) used for equalization (locking) of optical carrier frequency in all fiber channels; (b) polarization adjusters (508) used for co-alignment (locking) of the polarization states of all beams into identical states; (c) phase shifters (509) used to control piston phases of the transmitted laser beams for near-field and target-plane phasing; and (d) additional phase shifters (510) that may be used for high frequency (tens of MHz-range) dithering of piston phases, which could be utilized for fiber array phasing with one or another disclosed methods as described in further detail below, Note that phase shifters (509) and (510) could be integrated into a single device. To provide clarity in the description of the disclosed control methods these phase shifters and corresponding controllers (509.1) and (510.1) are shown as separate units.

Here we briefly describe the necessity for OPLD (507) and polarization (508) adjusters in high-power MOPA systems. Mutual phasing (phase-locking) of beamlets is associated with obtaining constructive interference between the beamlets. The interference between beamlets is possible and most efficient if their polarization states are co-aligned and they have identical optical carrier frequencies $\{\omega_j\}$ where j=1, . . . , N. The last requirement is associated with the so-called frequency locking condition $\omega_j$=constant, which can be fulfilled for laser beams originated from the same laser source. In the MOPA system for the coherent fiber array system, all beams originate from the same laser source but variations in OPLD between the different fiber channels may result in deviations in optical carrier frequencies. The OPLD adjusters (507) of the MOPA system (500) are used for the active compensation of optical carrier frequency deviations that result from the relatively small amplitude and slow varying changes of fiber lengths in different fiber channels, which are caused by fluctuations of temperature and vibrations. The methods and devices disclosed herein, and variations thereof, are capable of such active compensation of optical carrier frequency deviations.

Since the power threshold for nonlinear effects is lower in optical fibers that maintain the polarization state of propagating beams, known as polarization maintaining or PM fibers, non-PM fibers and fiber elements are most commonly used in high power MOPA systems. This allows for an increase of either the power $p_{fiber}$ in each fiber channel, or the delivery fiber length, or both. Note that the nonlinear threshold power level decreases when the delivery fiber length $l_{fiber}$ is increased. For this reason, in practical high-power single-mode fiber array systems the power-per fiber may be set on the order of $p_{fiber}$ ~1.0 kW-1.5 kW, which allows for an increase of delivery fiber length to practical levels of $l_{fiber}$ ~2 m–3 m or even longer. The polarization adjusters (508) with feedback controllers (508.1) in the MOPA system (500) in FIG. 5 maybe used to co-align and maintain the polarization states of the beamlets (100.4) and thus make phase locking possible. The methods and devices disclosed herein, and variations thereof, are capable of such active co-alignment of the beamlet's polarization states.

The phase shifters (509), for example lithium niobate (LiNbO$_3$) based, introduce controllable variations (modulations) in the piston phases of the outgoing beamlets. The control voltages (509.2) applied to the phase shifters are generated in a piston phase controller (509.1) as described in further detail below. After passing through the phase shifters (509) and piston phase dithering modulators (510), the laser beams are amplified using the high power fiber amplifiers (511) and enter the fiber collimators (100.2) of the fiber array laser head (100.1) through N delivery fibers (106.1). The transmitted power of individual beamlets can be adjusted using the laser power controller (511.1) of the MOPA system.

Figure 6:
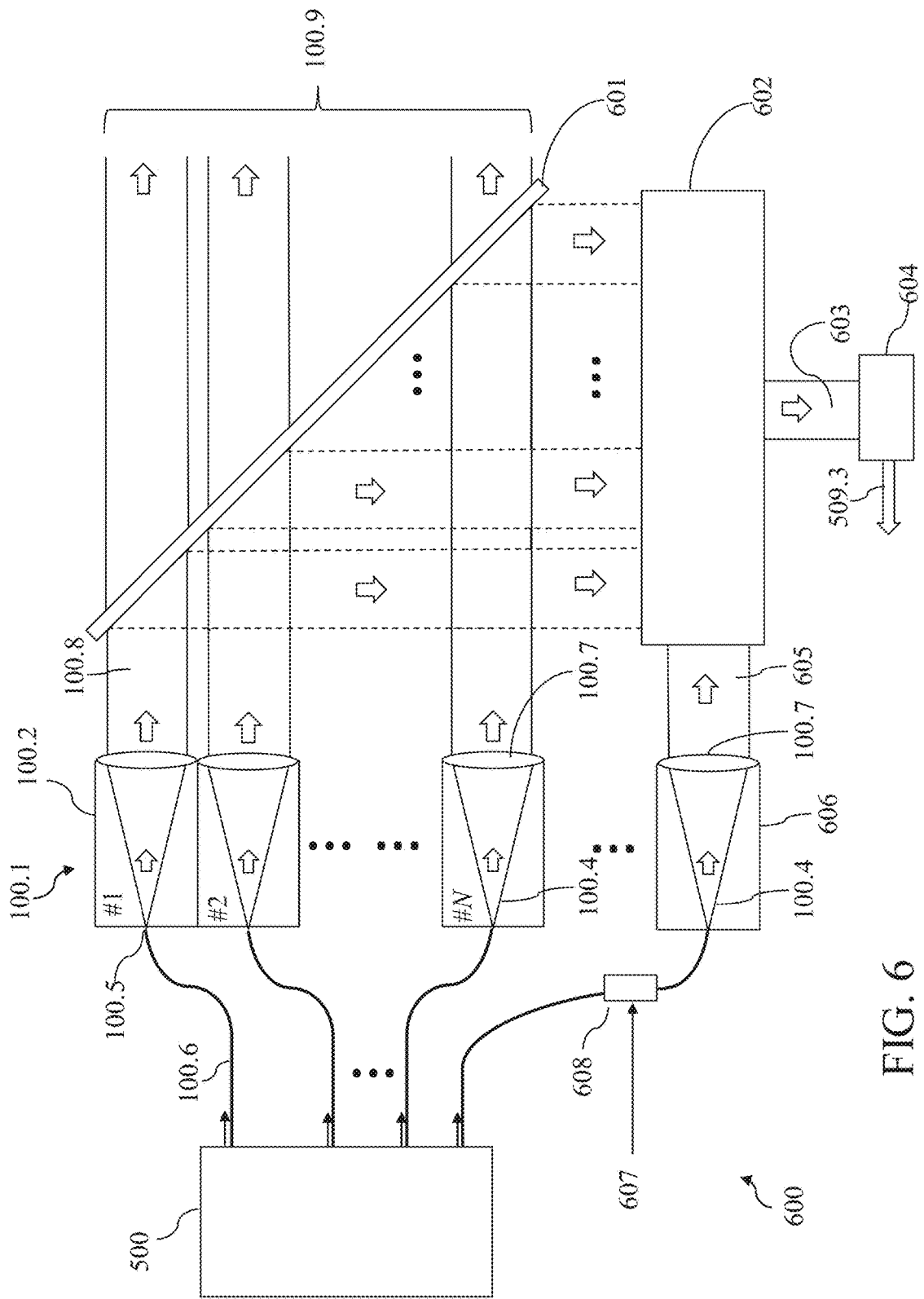
FIG. 6 is a schematic diagram of a fiber array system of the prior art with near field phase locking.

Near-field phasing: prior art and current technology challenges. As previously discussed, near-field phasing of the array of beamlets (100.8) is used to decrease the divergence of the combined beam (100.9) and thus boost up the laser power density inside the target hit-spot. Existing near-field phase locking systems can be sub-divided into two major categories dependent on the position of a sensor (or sensors) used for piston phase sensing and control: either inside (integrated into) the fiber array laser head, or external to the fiber array laser head. In the system illustrated in FIG. 6, an external beam splitter (601) (or an array of small size beam splitters) is used to redirect a portion of the emitted combined beam (100.9) to a beam combiner module ("BCM") (602). The BC M transforms deviations in the beamlet's piston phases (phase errors) into intensity modulations of the BCM output optical field (603), which is registered by a photo-detector (or an array of photo-detectors) of the phase locking receiver (604). The phase locking receiver output electrical signal (or multiple signals) (509.3) are sent to the phase locking controller (509.1) of the MOPA system control module (2401). The controller (509.1) computes control voltages (509.2) applied to the phase shifters (509) as illustrated in FIG. 5 and FIG. 6.

Figure 7A:
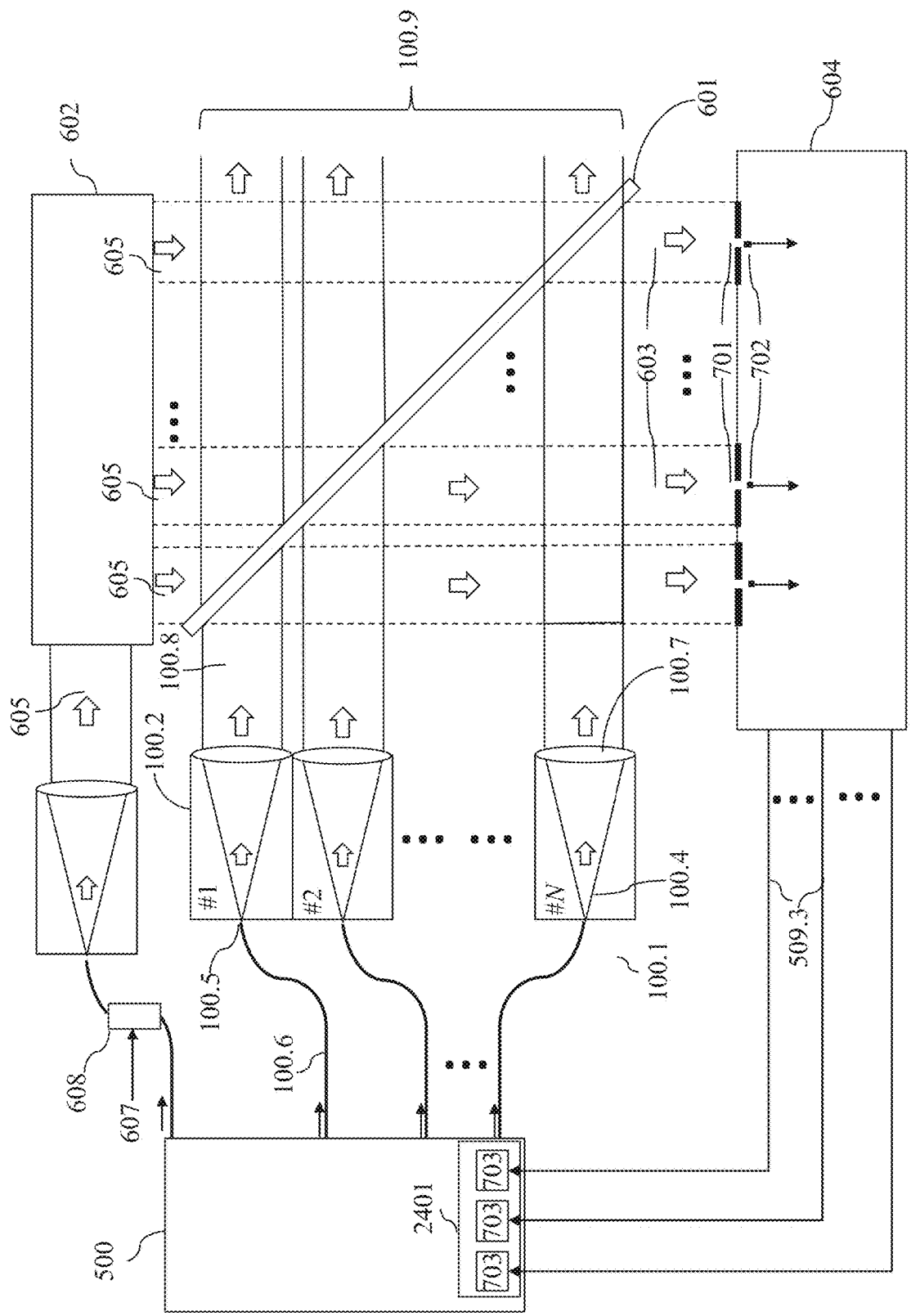
FIGS. 7A-7B are schematic diagrams of a fiber array system of the prior art with a multi-beam interferometer.

Two BCM types have been reported. The first BCM type represents a multi-beam interferometer ("MBI") that uses an external reference beam (605), while the second BCM type is referred to as a focal plane beam combiner (FPBC). The reference beam (605) in the MBI is commonly generated in the MOPA system as illustrated in FIG. 6. For the purpose of illustration only, the reference beam (605) in FIG. 6 is shown as being obtained with a fiber collimator (606) that is identical to the fiber collimators (100.2) of the fiber array laser head (100.1). The MBI-based phase locking system illustrated in FIG. 7A-77B represents a set of N operating in parallel interferometers sharing the same optical reference beam (605). At each moment of time t, the interference pattern intensity in the jth interferometer depends on the difference $\delta_j(t) = \Delta_j(t) - \Delta_0$ (piston phase error) between the piston phases of the jth beamlet $\Delta_j(t)$ and the reference beam $\Delta_0$, where $j = 1, \ldots, N$. In turn, the piston phase $\Delta_j(t) = \varphi_j(t) + u_j(t)$ depends on both the phase noise $\omega_j(t)$ in the jth fiber channel of the MOPA system and a corresponding controllable phase shift $u_j(t)$ introduced by the phase shifter (509) of the MOPA system to compensate this piston phase noise signal. Ideal compensation (near-field phase locking) corresponds to the condition $\delta_j(t) - \delta_k(t) =$ for all j, $k = 1, \ldots, N$, where $m = 0, 1, 2, \ldots$ is an integer number, Compensation of the phase noise in the fiber channels should occur over a time that does not exceed the characteristic time $\tau_{noise}$ of piston phase fluctuations (phase noise) in the fiber channels. In high power MOPA systems, the phase noise time may range from a few msec to μsec.

Figure 7B:
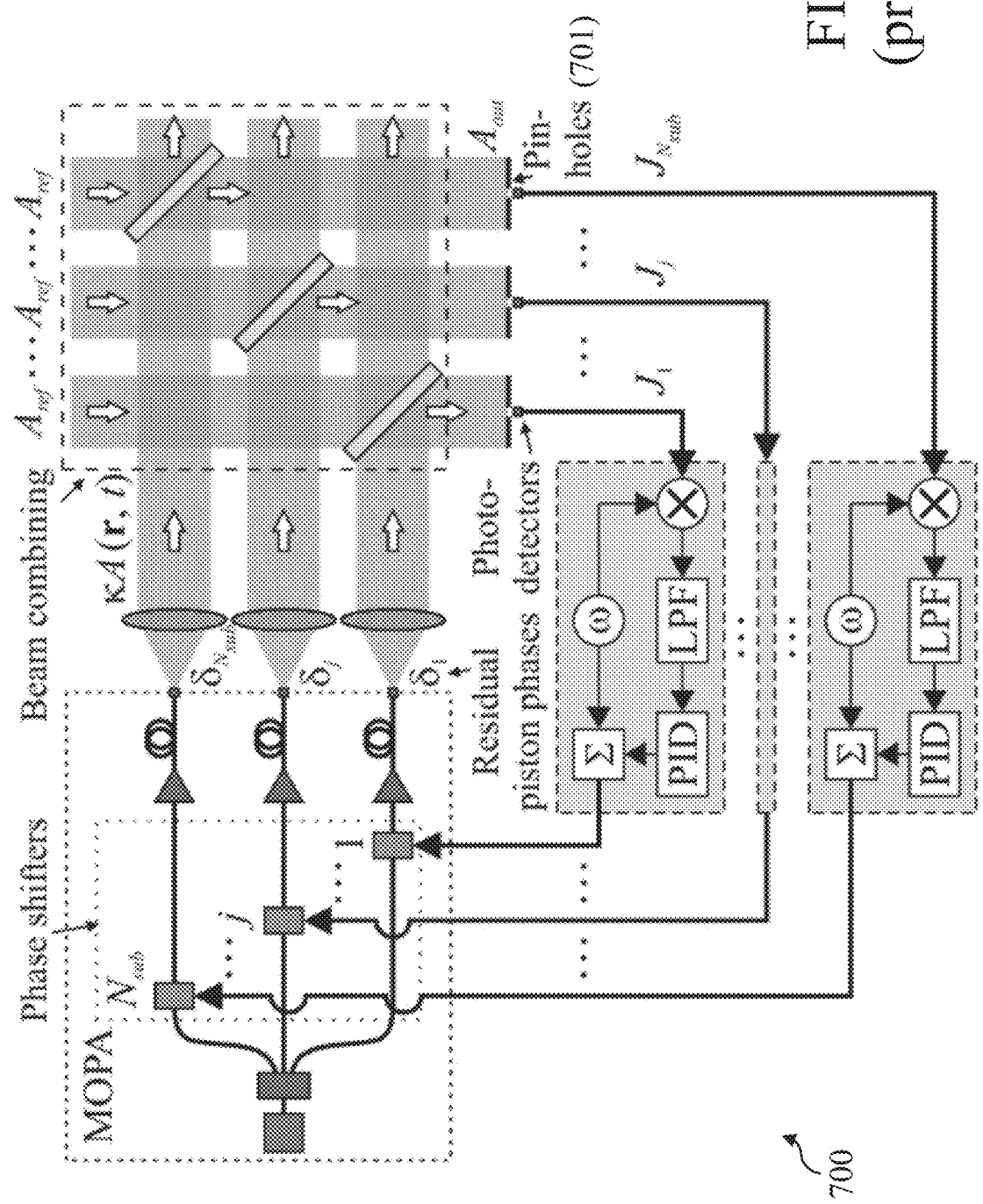

The phase locking receiver (604) in the MBI-type phase locking system may be composed of an array of N identical or near identical sensors, each comprised of a small diaphragm (pinhole) (701) and photo-detector (702) immediately behind as illustrated in FIGS. 7A-7B (prior art). The pinhole size depends on the expected range of angular misalignments between the reference beams (605) and beamlets (100.8), and typically matches the characteristic size of the corresponding interference fringes. The receiver signals $\{J_j(t)\}$ (509.3) registered by photo-detectors (702) of the phase locking receiver module (604) are sent to the phase locking controllers (703) of the MOPA system control module (2401). The piston phase controller is composed of an array of independently operating control subsystems (703) that stabilize the corresponding interference patterns. To increase the signal-to-noise ratio in the detection of piston phase errors $\{\delta_j(t)\}$ a small amplitude sinusoidal signal (607), known as a dithering signal, with frequency ω (typically on the order of 100 kHz-1.0 MHz) is applied to either the phase modulator (608) of the reference beam or to the phase modulators (510) of the MOPA system (500). The dithering signal can be introduced using, for example, a fiber-integrated phase shifter (608) as shown in FIG. 6 or using the phase modulators (510) of the MOPA system as in FIGS. 7A-7B. Signal processing in each control subsystem (703) can be based on the standard synchronous detection (heterodyne) technique. In this technique the measured (509.3) and dithering (607) signals are first multiplied. The product of multiplication is sent to a low-pass filter and further to the proportional-integral-derivative (PID) controllers that generate the control voltages (510.2) applied to the phase shifters (510) of the MOPA system.

Drawbacks of the described near-field sensing techniques based on the heterodyne multi-beam interferometer include difficulties in alignment of the multiple optical elements of the MBI beam combiner (602), high sensitivity to environmental factors such as vibrations and temperature variations, and the potential presence of unwanted phase aberration in the MDI optical train composed of the external beam splitter(s) (601) and the optical elements of the beam combiner (602). This aberration, which is not present in the transmitted combined beam (100.9), is compensated for by the phase locking system resulting in the appearance of a parasitic, known as non-common path, phase aberration in the combined beam (100.9). These known drawbacks of the MBI-type phase locking technique became worse when transitioning to HP and, especially, to EHP fiber array systems that are composed of a large number of subapertures, thus making this phase-locking technique impractical for these applications. The methods and devices disclosed herein, and variations thereof, mitigate or eliminate these problems.

Figure 8A:
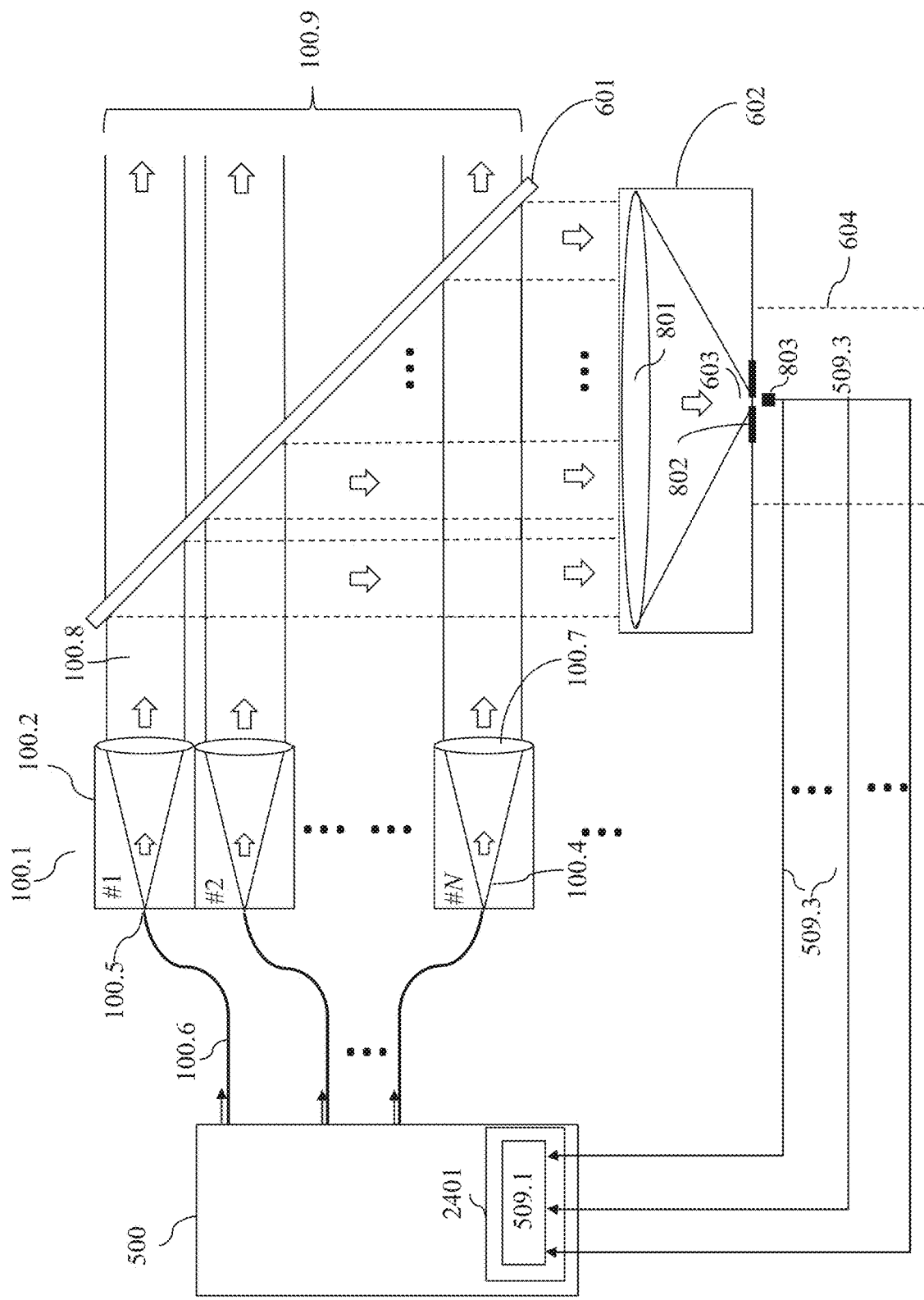
FIGS. 8A-8B are schematic diagrams of a fiber array system of the prior art with focal plane beam combining.
Figure 8B:
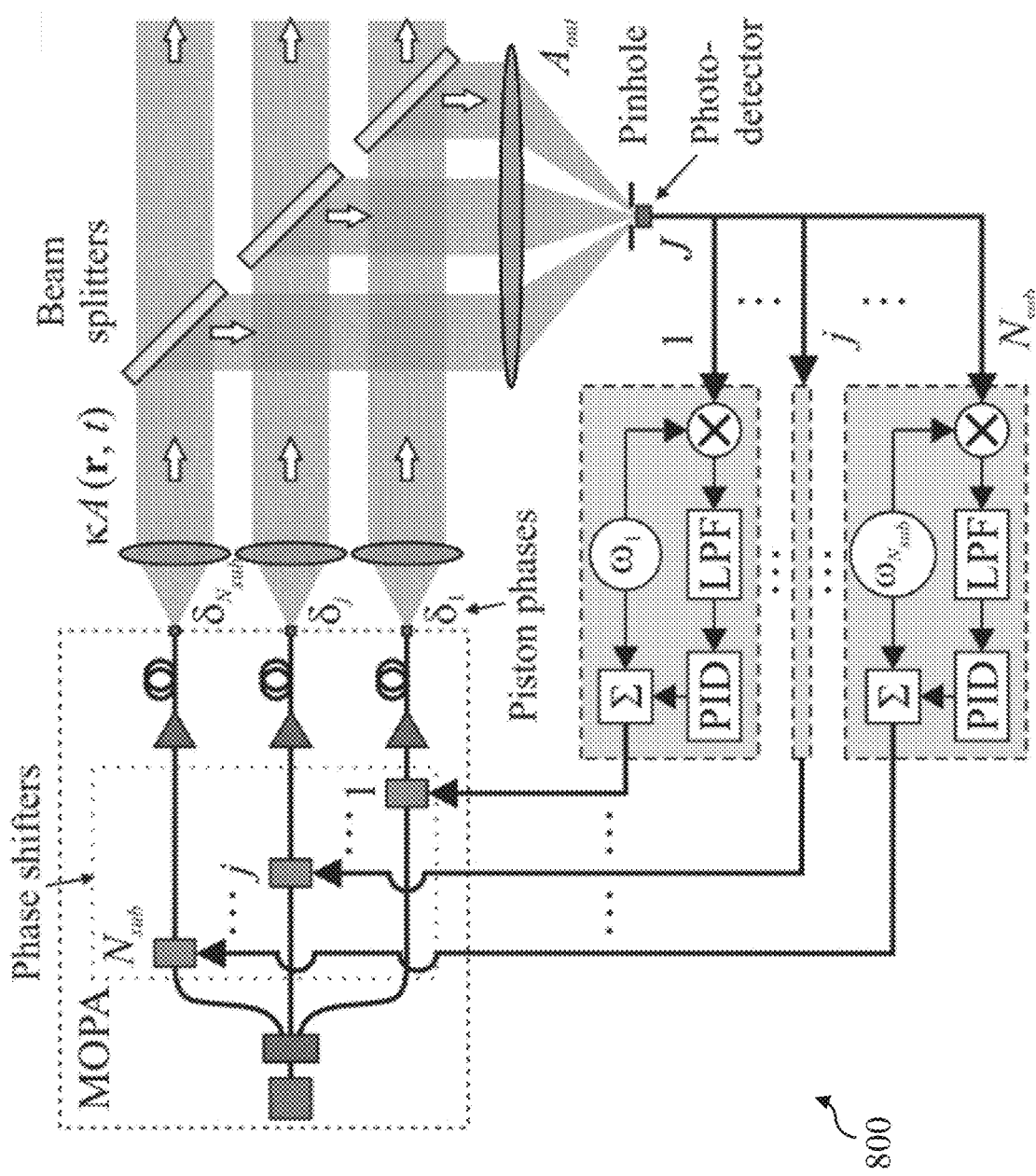

Another known near-field phase locking technique is based on the utilization of focal-plane beam combining ("FPBC"), which does not require an additional reference beam as in the MBI-type systems. In the FPBC method of the prior art, the collimated beamlets (100.8) are reflected by the beam splitter(s) (601) and mutually overlapped in the lens (801) focal plane as illustrated in FIGS. 8A-8B. In this system (800), a lens (801) that focuses all beamlets into a single joint focal spot is an example of the most commonly used type of beam combiner (602). In the FPBC technique, the beam combiner output field (603) represents the intensity distribution in the lens focal plane. This intensity distribution depends on the relative differences in piston phases $\{\Delta_j(t)\}$ (piston phase errors) and is utilized for piston phase sensing and control. In the FPBC-type phase locking system in FIGS. 8A-8B, the optical receiver (604) is composed of a small pinhole diaphragm (802) located at the lens focus with a photo-detector (803) behind it. For pinholes that do not exceeding the Airy spot size corresponding to the overall fiber array diameter D, the measured signal (510.3) J is a function of the piston phase errors $\{\Delta_j(t)\}$: $J(t) = J(\Delta_1, \ldots, \Delta_j, \ldots, \Delta_N)$. It is apparent to those of ordinary skill in the art in light of this disclosure that this function reaches maximum when the phase locking conditions $\Delta_j(t) - \Delta_k(t) =$, where $\Delta_j(t) = \varphi_j(t) + u_j(t)$, and $j, k = 1, \ldots, N$ and $m = 0, 1, 2, \ldots$ is an integer number, discussed above are fulfilled, Correspondingly, the measured signal $J(t)$ can be used as a phase locking performance metric (pinhole-based metric).

The phase locking controller (509.1) of the MOPA system control module (2401) is designed to maximize the pinhole-based metric $J(t)$ using one or more optimization techniques such as multi-dithering (LOCSET), gradient descent, stochastic parallel gradient descent (SPGD), gradient-flow, etc.

As an illustration, FIGS. 8A-8B (prior art) shows a schematic of a near-field phase locking system with a multi-dithering controller that maximizes the pinhole metric (509.3). In this system small perturbations applied to the phase shifters (510) of the MOPA system have different dithering frequencies $\{\omega_j\}$. Similar to the prior art heterodyne phase-locking controller in FIGS. 7A-7B, the measured metric signal J(t) is multiplied by the corresponding dithering signals. The products of this multiplication are sent to the corresponding low-pass filters and further to the proportional-integral-derivative (PID) controllers. The dynamical process in this multi-dithering control system leads to maximization of the pinhole metric and corresponding compensation of the piston phase noise components $\{\varphi_j(t)\}$ in the fiber channels of the MOPA system.

One advantage of the phase locking technique based on focal plane beam combining is that it is relatively simple and requires only a few optical elements (e.g. an external beam splitter and a single lens or off-axis focusing mirror). As a result, the system is easier to align and is much less sensitive to vibrations. Nevertheless, similar to the MBI, the FPBC technique suffers from non-common path phase aberrations. In addition, since phase locking control in this system is based on the maximization of a single metric J ($\Delta_1, \ldots, \Delta_j, \ldots, \Delta_N$) that depends on all phase errors $\{\Delta_j(t)\}$, the control channels in this system are strongly coupled. As a result, phase locking may require additional time in comparison with the MBI-based control system where all control channels are independent. Independent of the algorithm used (e.g., multi-dithering, gradient descent, stochastic parallel gradient descent (SPGD), etc.), the phase locking process convergence time $\tau_{conv}$ in the FPBC-type phase locking control system rapidly increases with an increase in the number N of control variables (e.g., number of controlling piston phases $\{u_j(t)\}$), which corresponds to the number of fiber channels in the MOPA system. With the high number of fiber channels N that is typical for HP and EHP fiber array systems where N could be on the order of several hundreds, the phase locking convergence time $\tau_{conv}$ may exceed the characteristic time $\tau_{noise}$ of parasitic fluctuations of piston phases in the MOPA system (phase noise) thus making phase locking systems ineffective. In addition, an increase of N typically leads to an increase of the probability for the control system to be trapped in a local maxima of the optimizing pinhole metric J, which may lead to the appearance of uncompensated piston phase errors. Another major problem for the FPBC near field phase locking technique is the utilization of a large aperture lens (801) or off-axis focusing mirror that focuses beamnlets into the pinhole receiver (604) as illustrated in FIGS. 8A-8B. The lens aperture diameter should be at least equal to the fiber array overall aperture diameter D. In HP and EHP systems this diameter could be on the order of 0.3 m-0.5 m or even larger with a corresponding focal distance of a few meters, thus resulting in impractical, extremely bulky, and expensive sensing systems. These challenges for near-field phasing based on an external beam splitter can be resolved with the methods and devices described herein, and variations thereof.

Figure 9:
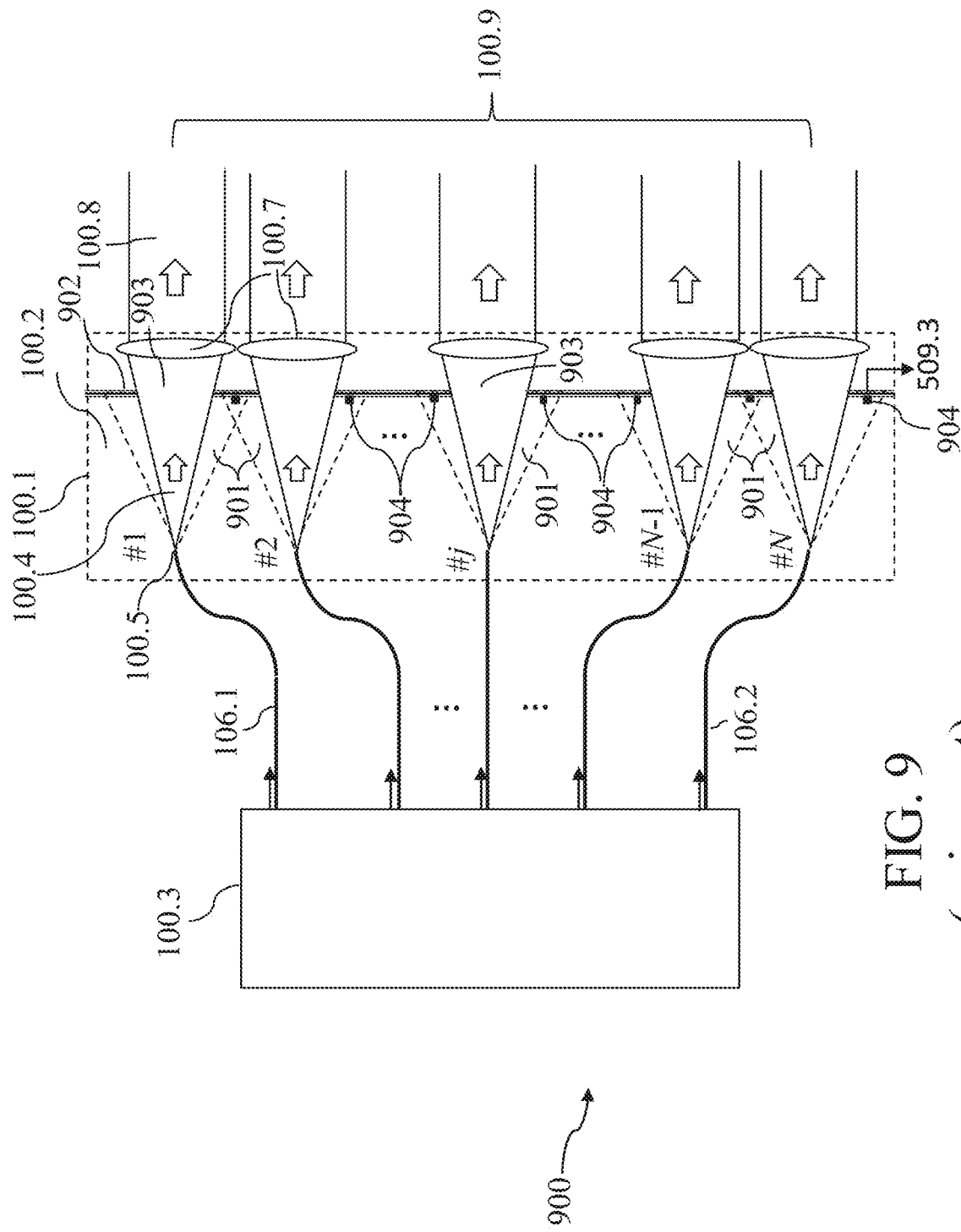
FIG. 9 is a schematic diagram of a fiber array system with integrated beam tail interference (BTI) sensors of the prior art.
Figure 10:
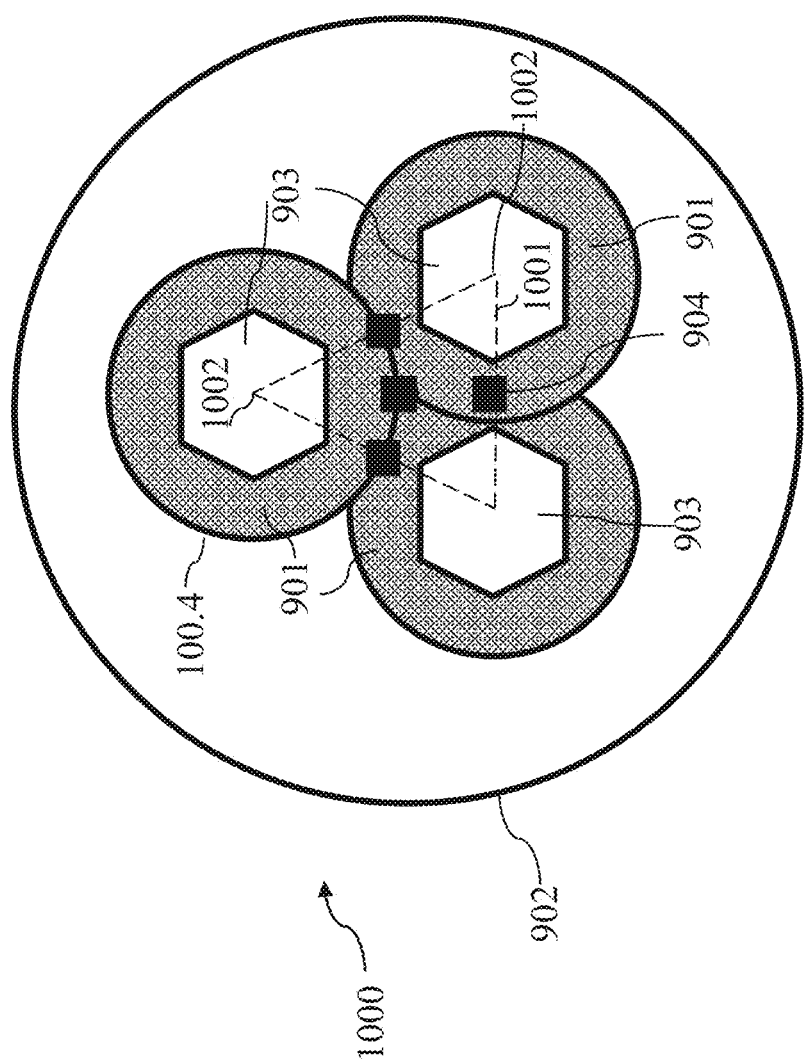
FIG. 10 is a schematic diagram illustrating photodetector placement of the prior art for the sensor of FIG. 9.

In an alternative near-field phase locking approach the piston phase error sensors, also known as beam-tail interference (BTI) sensors, are directly integrated into a fiber array laser head. The basic concept of BTI piston phase sensing of the prior art is illustrated in FIG. 9 using, as an example only, a fiber array laser head composed of a linear array of adjacent fiber collimators. BTI sensing is based on the interference of the truncated (tail) sections (901) of the divergent laser beams (100.4) emitted through the adjacent fiber tips (100.5) The tail sections (901) of the adjacent laser beams overlap in the proximity of collimating lenses (100.7) leading to interference between the corresponding optical fields, which is referred to as beam-tail interference. A mask (902) with an array of holes (903) whose centers coincide with the optical axes of the beams (100.4) is positioned inside the fiber array laser head (100.1) prior to the collimating lenses (100.7) of the beam forming optics. The size of each hole is large enough to prevent obscuration of the corresponding subaperture (collimating lens aperture) of the laser head as illustrated in FIG. 9. An array of small photo-detectors (904) is assembled at the mask (902). The photo-detectors are located either in the middle of the line (1001) connecting the centers (1002) of two adjacent holes (903), or at the center of a triangle formed by the centers of three adjacent holes (or at both locations) as illustrated (1000) in FIG. 10 of the prior art, where examples of only three adjacent hexagonal holes (903) on the mask (902) are shown. For optimal signal-to-noise ratio (SNR) in interference signal sensing, the photo-detector size should match the characteristic width w of the interference fringes caused by the interference of the tail sections of adjacent beams. The signals (509.3) $\{J_{j,k}(t)\}$, where jk, and j, k=1, ..., N measured by the photo-detectors (904) depend on the piston phase differences (phase error) between the adjacent subapertures $\delta_{jk}(t)=\Delta_j(t)-\Delta_k(t)$. These signals are sent to the MOPA system control module (2401). After signal processing (e.g. filtering, normalization, etc.) the signals (509.3) are sent to the phase-locking controller (509.1). The phase locking controller locks the piston phases of neighboring beamlets using one or another control algorithm such as for example multi-dithering (LOCSET), gradient descent, stochastic parallel gradient descent (SPGD), gradient-flow, etc. Note that the near-field phase locking technique based on BTI sensing may require a network of photo-detectors (904) that interconnect all fiber array subapertures.

In order to provide sufficient SNR in measurement of the signals $\{J_{j,k}(t)\}$ (509.3) the characteristic width w of the interference fringes in the BTI sensors should be larger than (or at least comparable to) the size $d_{PD}$ of the photo-detector (904). It can be shown that the value w can be estimated as w=$\lambda$(f/l), where $\lambda$ is wavelength, l<d is the distance between two neighboring fiber tips (fiber array laser head pitch), d is fiber array subaperture size and f is the distance between the fiber tips (100.5) and the mask (902) with assembled photo-detectors (904). In fiber-array systems the ratio f/l is on the order of 5 or even less. Correspondingly, the photo-detector size $d_{PD}$ should be as small as only a few microns, which may not allow obtaining sufficient SNR in the measurement of the signals $\{J_{j,k}(t)\}$, and also makes practical implementation of the BTI sensors technically challenging. These challenges of near-field phasing locking technique can be resolved with the methods and devices described herein, and variations thereof.

Figure 11:
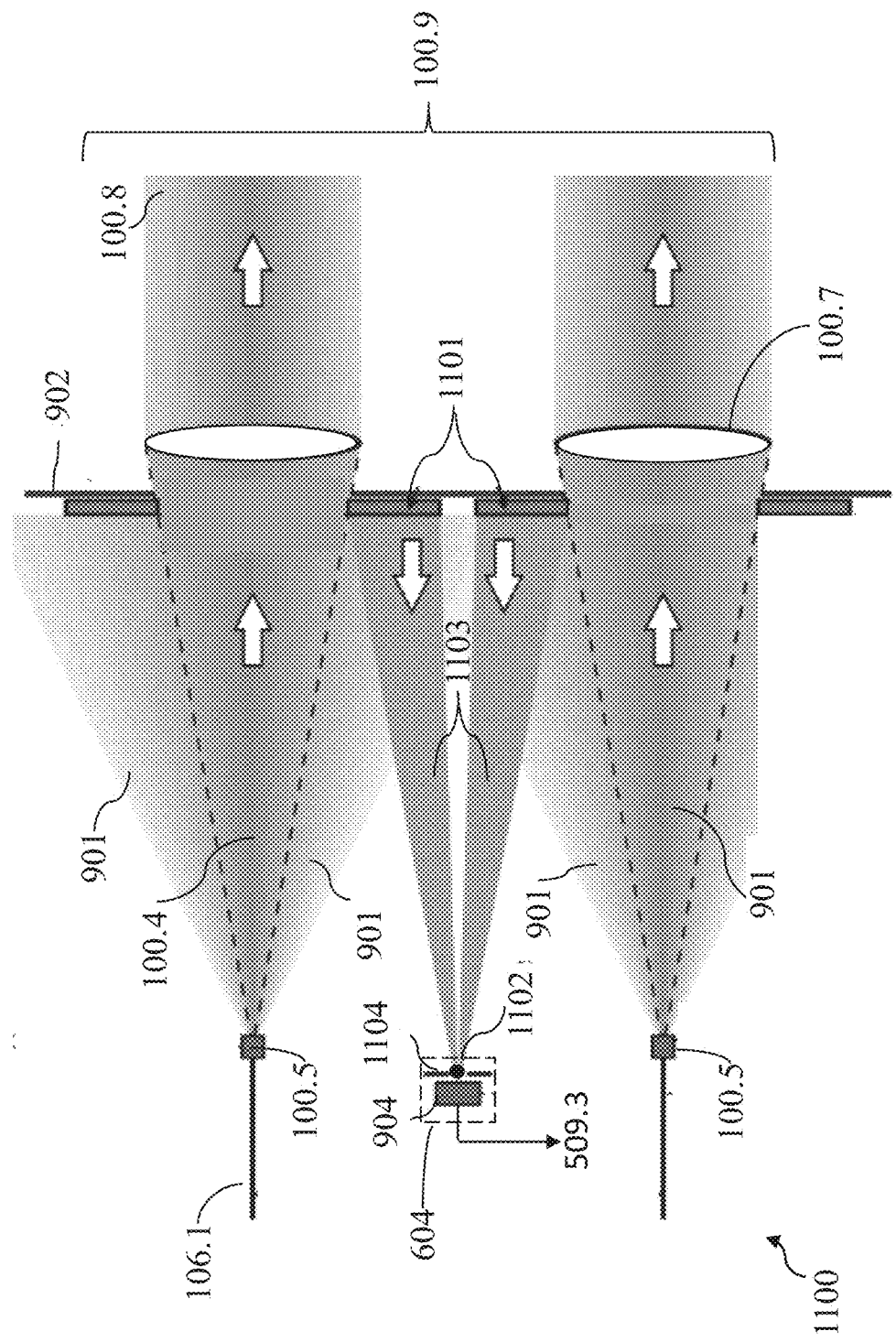
FIG. 11 is a schematic diagram of an alternate BTI sensor of the prior art.

To increase the characteristic width w of the BTI fringes and thus improve SNR in the measurement of piston phase errors and, correspondingly, the performance of the phase-locking system, the beam tail sections (901) corresponding to adjacent fiber array subapertures can be reflected back using one or another assembly of off-axis parabolic mirrors (1101) attached to a mask (902) as illustrated (1100) in FIG. 11 of the prior art using two adjacent fiber array subapertures as an example. These off-axis mirrors have a joint focus (1102). The tail sections (1103) of the laser beams are reflected from the off-axis mirrors (1101) and overlap in the joint focus (1102), resulting in an interference signal that is dependent on the piston phase error measured by an optical receiver (604). In FIG. 11 this optical receiver is composed of a small pinhole diaphragm (1104) located at the joint focus (1102) with photo-detector (904) behind. The measured signals (509.3) are processed and sent to the near-field phase locking controller. Different geometries and configurations of the off-axis mirror assemblies are reported, including assemblies composed of diffractive optics elements (DOEs). The major drawbacks of this technique is that it may require extremely high accuracy in mutual alignment of multiple optical components including positions of fiber tips, off-axis mirror assemblies and optical receivers. In the presence of HP laser power-induced thermomechanical deformations, misalignments and/or vibrations, the focal spots of the adjacent beam tails may not overlap resulting in an inability to measure the piston phase errors, Another major problem for near field phasing techniques that utilize BTI sensors integrated into the fiber array laser head is non-common path (unsensed) phase aberrations of the combined beam (100.9). These aberrations result from variations in the optical thickness of the collimating optical elements (100.7) of the fiber array and/or errors in positioning of the beam-tail focusing mirror (1101) and/or optical receiver (604) assemblies. It has been suggested to pre-compensate these unsensed phase errors using glass plates with pre-calibrated thickness or liquid crystal (LC) phase-shifting elements (LC cells) that are positioned in the optical train of the outgoing beamlets immediately after they exit the collimating lenses (100.7). Nevertheless, this technical approach adds additional complexity and system cost and is unpractical for HP and EHP fiber array systems.

Figure 12:
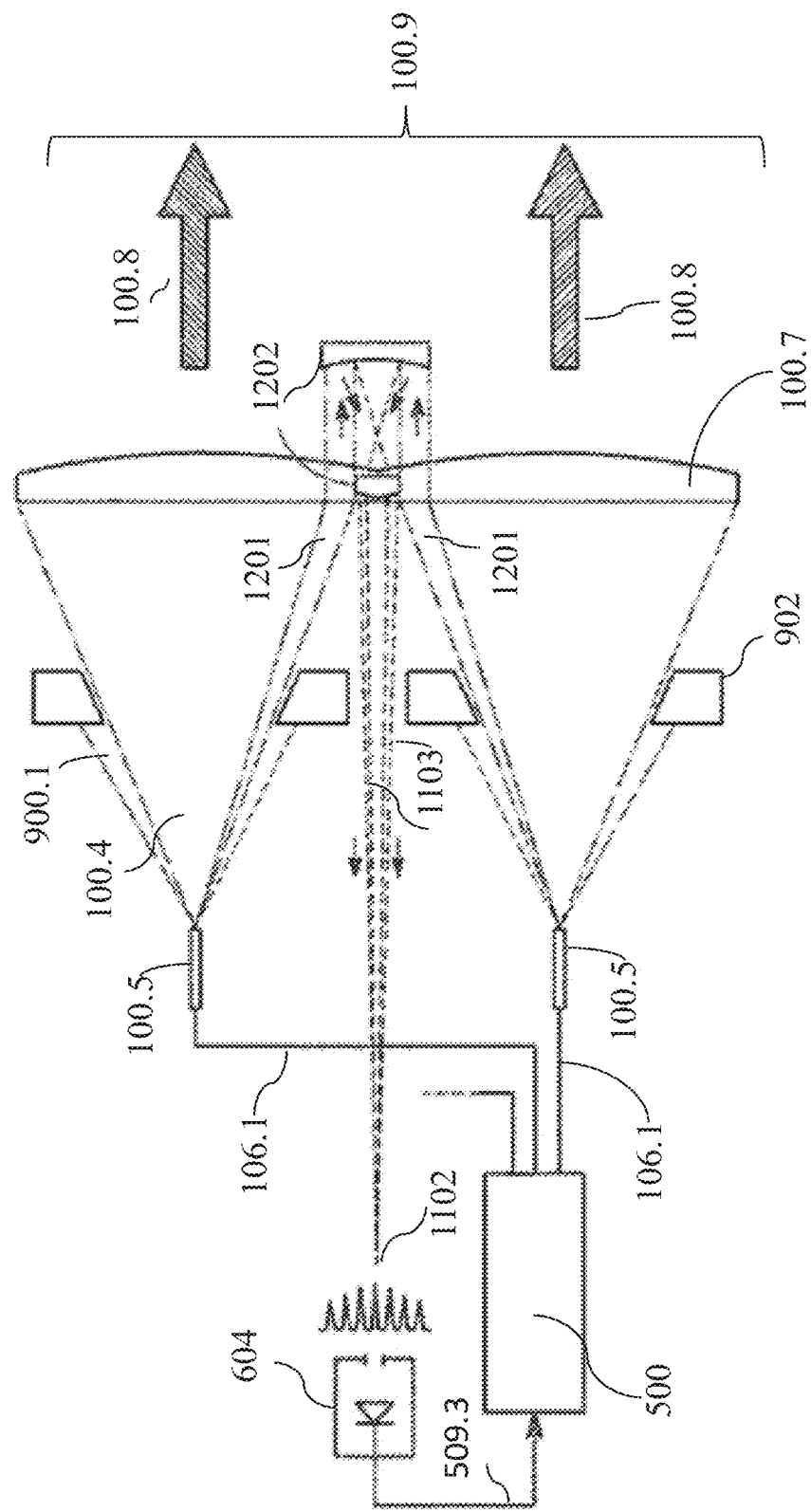
FIG. 12 is a schematic diagram of a MOPA system of the prior art including an exemplary BTI sensor.

In the reported and illustrated BTI sensing system (1200) in FIG. 12 of the prior art, the laser beam tails are blocked by a mask (902) while portions (1201) of the laser power of three adjacent beamlets around the joint corners of the collimating lenses (100.7) are utilized for near field phase locking. These beamlet light portions pass through the collimating lenses (100.7) and are redirected back to the fiber array laser head using an array of optical assemblies (1202) placed outside the fiber array laser head (100.1). Although the piston aberrations of the collimating optical elements (100.7) in the BTI sensing system in FIG. 12 are accounted for, the optical assemblies (1202) introduce additional piston phase aberrations that are not present in the combined beam (100.9) and, hence, cannot be compensated by the corresponding near-field phase locking system. In addition, the optical assemblies (1202) clip a portion of the transmitted beamlets' (100.8) power thus decreasing the overall combined beam power. They also reduce the fiber array fill factor resulting in a lessening of the laser power density in the target aimpoint vicinity. In addition, they are difficult to align and may also suffer from misalignments resulting from thermomechanical deformations and vibrations. The BTI sensing systems illustrated in FIG. 11 and FIG. 12 are also vulnerable to undesirable light components that may be present inside the beam tail region including cladding and stray light, higher order modes, and residual pump light. All these laser light components may be superimposed with the sensing light of the main beam tail section resulting in a decline in signal-to-noise ratio (SNR) in the measuring signals.

All of the above problems of conventional near-field phase locking systems based on measurements of piston phase errors using BTI sensors or optical assemblies external to the fiber array laser head can be resolved with the methods and devices described herein, and variations thereof.

Methods for near-field phase locking using beam-tail interference sensors with amplitude gratings (BTI-AG technique): As already mentioned, one of the major problems with the near-field piston phase locking technique in FIG. 9 of the prior art is the small width w of the beam-tail interference fringes. The small width may be on the order of a few microns in most practical cases) and may require an even smaller $d_{PD}$ photo-detector. As an example, a requirement $dPD<w$ prevents averaging the measured signal over several fringes, which may lead to an unacceptably low signal-to-noise (SNR) and may result in insufficient accuracy in piston phase measurements. On the other hand, under the requirement $(d_{PD}<w)$ on the photo-detector size, the SNR could also be low because there may not be sufficient laser power inside the beam tail interference regions.

This problem can be resolved using the disclosed method of beam-tail interference (BTI) sensing with a phase locking receiver composed of an amplitude grating located in front of a single photo-detector, a set of photo-detectors, or a photodetector array. For the sake of discussion, we only consider a single photo-detector. However, it will be appreciated with the benefit of the present disclosure how the disclosed configurations can be expanded to include a set of photodetectors or a photodetector array.

According to the present disclosure, the photo-detector size $d_{PD}$ can be significantly larger than the interference fringe width w $(d_{PD} \gg w)$. This method, referred to as BTI sensing with an amplitude grating (BTI-AG), does not suffer from measured signal averaging over several fringes, and this method provides better SNR in piston phase sensing and improved performance of the BTI based NFPL system.

Figure 13:
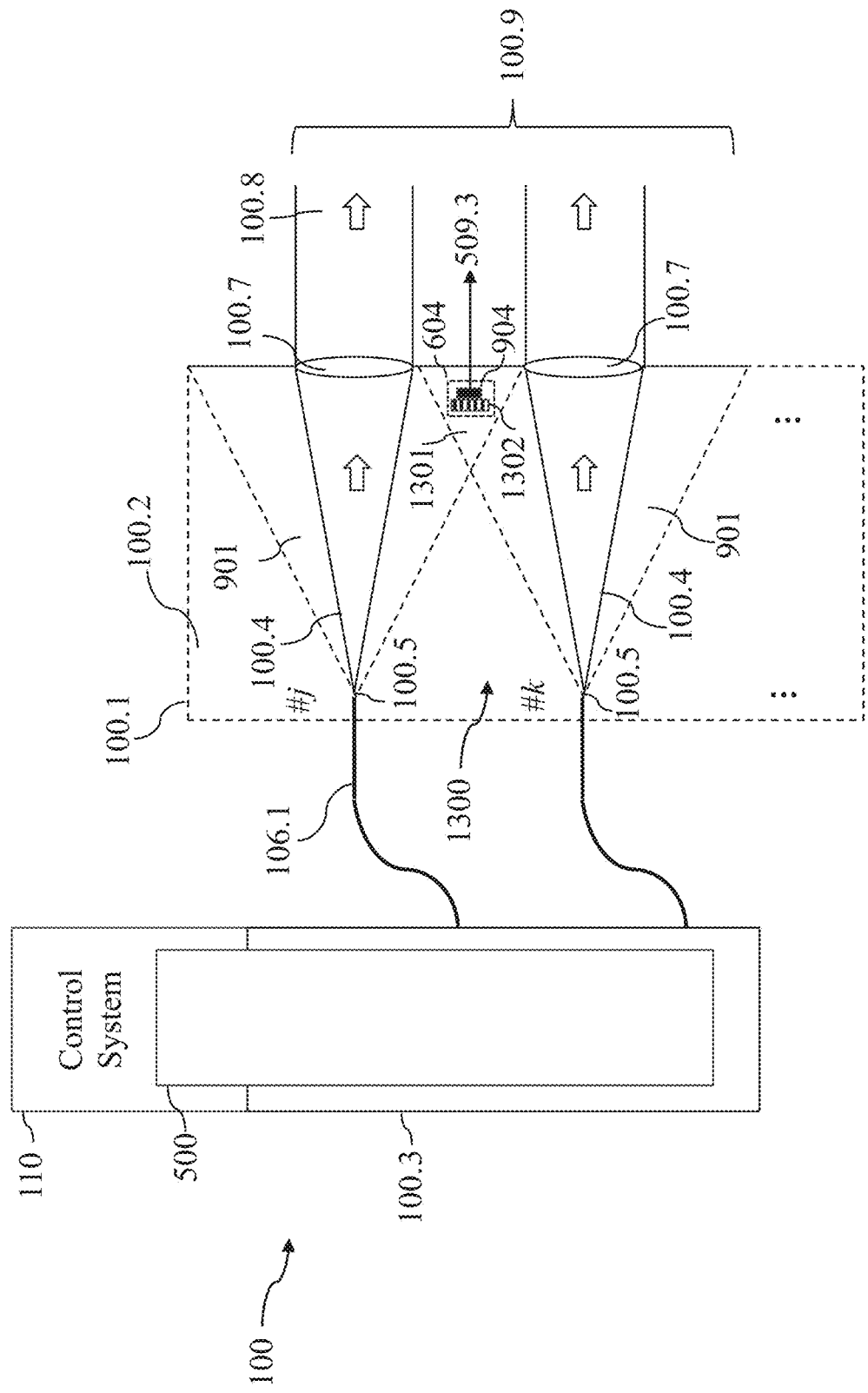
FIG. 13 is a schematic diagram of a fiber array laser system having an exemplary beam tail interference sensor with an amplitude grating (BTI-AG sensor) according to the present disclosure.

Examples of the BTI-AG method are illustrated in FIG. 13 and FIGS. 14A-14C, showing a sensor (1300) for the fiber array laser system (100). As disclosed herein and as shown in FIG. 13 5 the teachings of the present disclosure are directed to a coherent fiber array laser system (100) composed of an array of densely packed laser transmitters (100.1), a multi-beam fiber laser source (100.3), a control system (110), and a sensor system (1300). The laser transmitter array (100.1) is also known as a fiber array laser head. As noted, different examples of fiber array laser heads with subapertures in varying numbers, shapes, and arrangements can be used. The control system (110) is only schematically shown here and includes a master oscillator power amplifier (MOPA) system (500), which is also only schematically shown, but would encompass the details disclosed with reference to FIG. 5. As will be appreciated with the benefit of the present disclosure, the control system (110) may have a number of controllers, modules, and other systems as discussed in more detail below.

In the example of FIG. 13, the sensor (604) is illustrated for only two adjacent subapertures (100.2) of the fiber array laser head (100.1), defined as the #jth and #kth subapertures. In the BTI-AG method, a phase locking receiver (604) referred to here as the BTI-AG sensor, is located in (or near) a center of a region (1301) of two beam tails (901) overlapping one another, where interference of the beam tails results in nearly parallel fringes of width w. In the BTI-AG sensing method, the amplitude grating (1302) is located in front of a photo-detector (904). The amplitude grating (1302) may be manufactured as a binary or grey-scale transmissive laser light mask. The grating (1302) is oriented parallel to the interference fringes and has an equal or nearly equal period with the fringe pattern.

Figure 14:
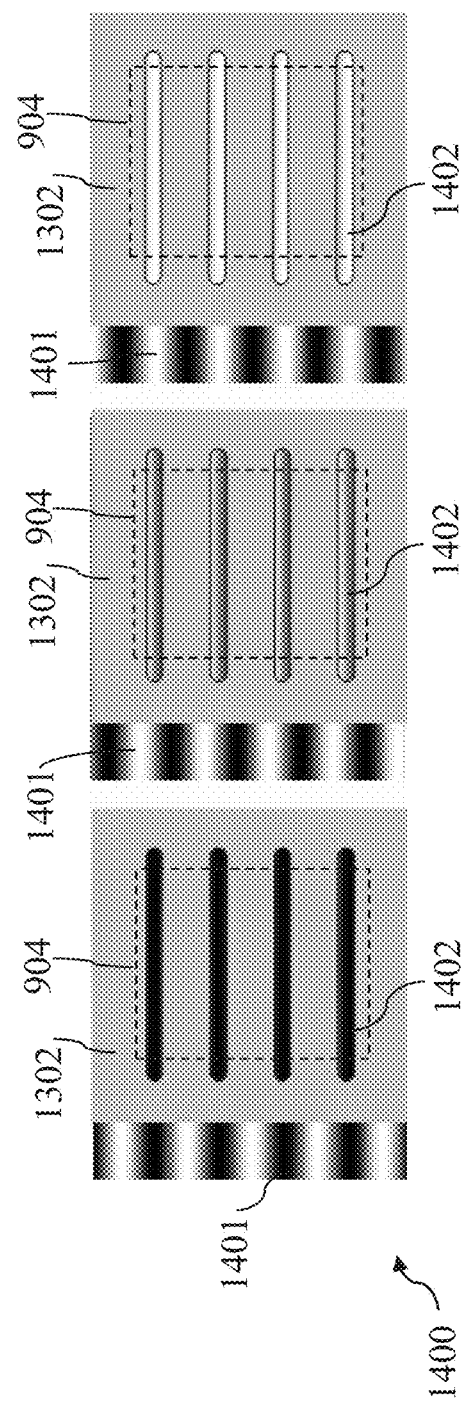
FIGS. 14A-14C illustrate an operational principle of the BTI-AG sensor of FIG. 13.

FIGS. 14A-14C illustrate an operational principle (1400) of the BTI-AG sensing method showing exemplary contours of a photo-detector (904) relative to interference fringe pattern (1401). The amplitude grating (1302) positioned relative to the photodetector (904) is made as an opaque mask with narrow slits transparent for laser light (1402). The slits in the grating (1302) are parallel to the fringes and have a period identical to the fringes. FIG. 14A through FIG. 14C illustrate the locations of the interference fringes for three different values of piston phase difference $\delta_{jk}(t)=\Delta_j(t)-\Delta_k(t)$, where $\Delta_j(t)$ and $\Delta_k(t)$ are the piston phases of adjacent laser beams (100.4) corresponding to the #jth and #kth subapertures of FIG. 13. With a change in $\delta_{jk}(t)$, the interference fringe pattern (1401) moves across the grating (1302) causing modulation of the light transmitted through the slits (1402) that enters the photodetector (904), The amount of measured laser light power $J_{j,k}(t)$ depends on the position of the interference fringes with respect to the slits (increasing from left to right in FIGS. 14A-14C) and hence depends on the phase difference $\delta_{jk}(t)$.

As can be seen from FIGS. 14A-14C, the BTI-AG sensor enables more light to be collected than can be achieved with the BTI sensor utilizing a small photo-detector (FIG. 9, prior art), It is easy to understand by those of ordinary skill in the art in light of this disclosure, that the signal (509.3) $J_{j,k}(t)$ registered by the photo-detector (904) is a periodic function of the phase difference $\delta_{jk}(t)$. This signal can be utilized for the locking of piston phases of adjacent fiber array beamlets using one or another known control algorithm (e.g., multi-dithering (LOCSET), SPGD, decoupled SPGD, gradient descent, gradient flow, etc.).

Figure 15:
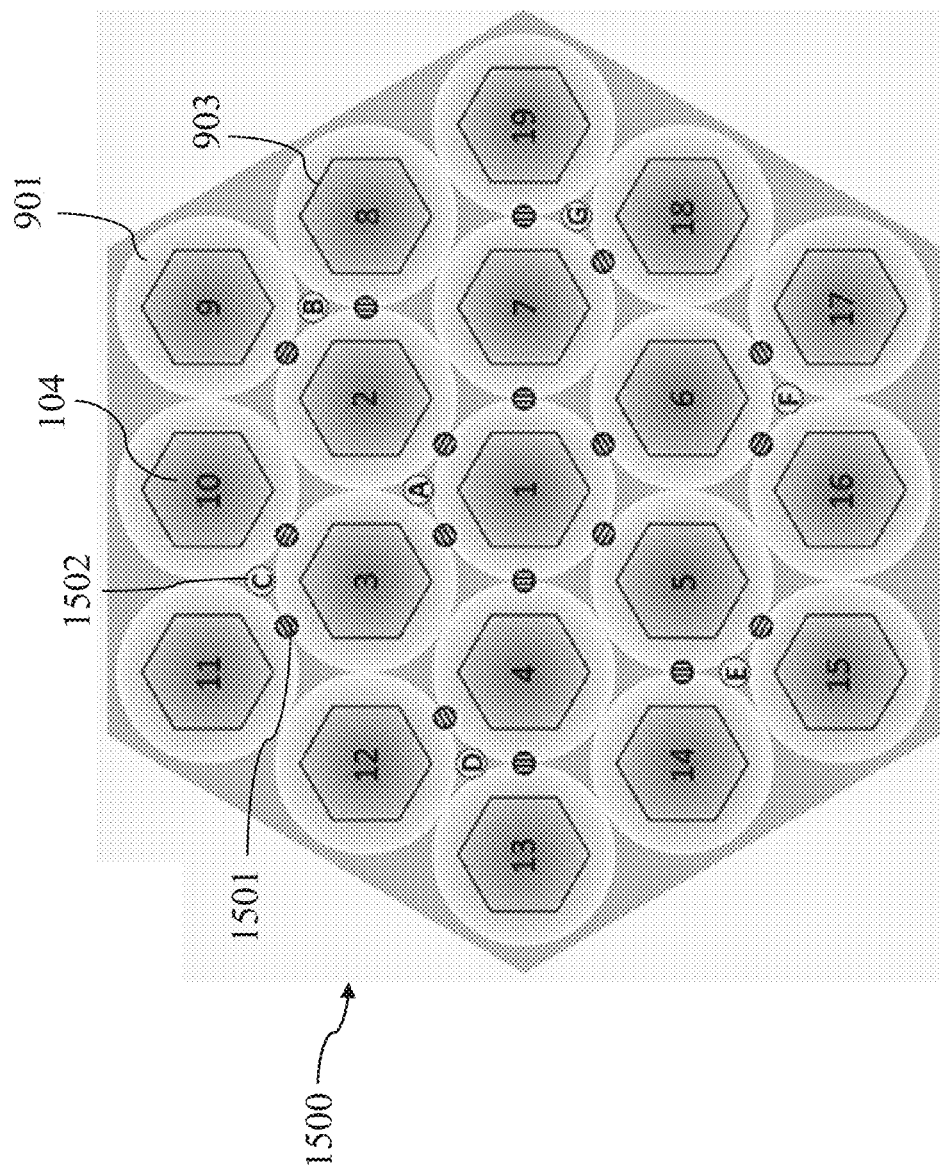
FIG. 15 is a schematic diagram of a sensing element of an exemplary fiber array laser head of the present disclosure composed of a network of sensors based on two and three beam tails interference.

The near-field phase locking of a combined beam (100.9) with the disclosed BTI-AG method may require a network of BTI-AG sensors interconnecting all fiber array subapertures. An exemplary network of the BTI-AG sensors (1501) is illustrated in FIG. 15 for a fiber array laser head (1500) composed of 19 hexagonal shape subapertures. To avoid misalignments of individual amplitude gratings, the gratings may be manufactured (for example using lithography) on a monolithic substrate as a single unit. This integrated amplitude grating unit may be made of glass, fused silica, sapphire or other appropriate material. The photo-detectors with electronic circuitry may be either integrated into the same unit using, for example, silicon-on-sapphire technology, or may be made as a standalone board located behind the integrated grating unit.

Figure 16:
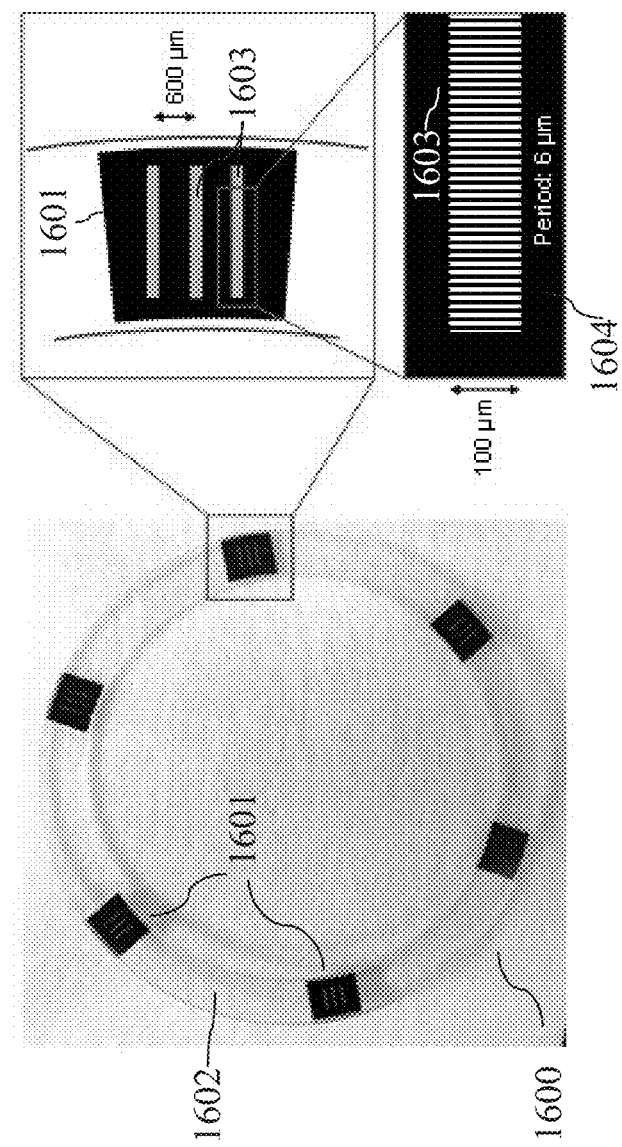
FIG. 16 shows a front elevation view of an exemplary grating unit of the present disclosure, including a magnified view of a grating.
Figure 17:
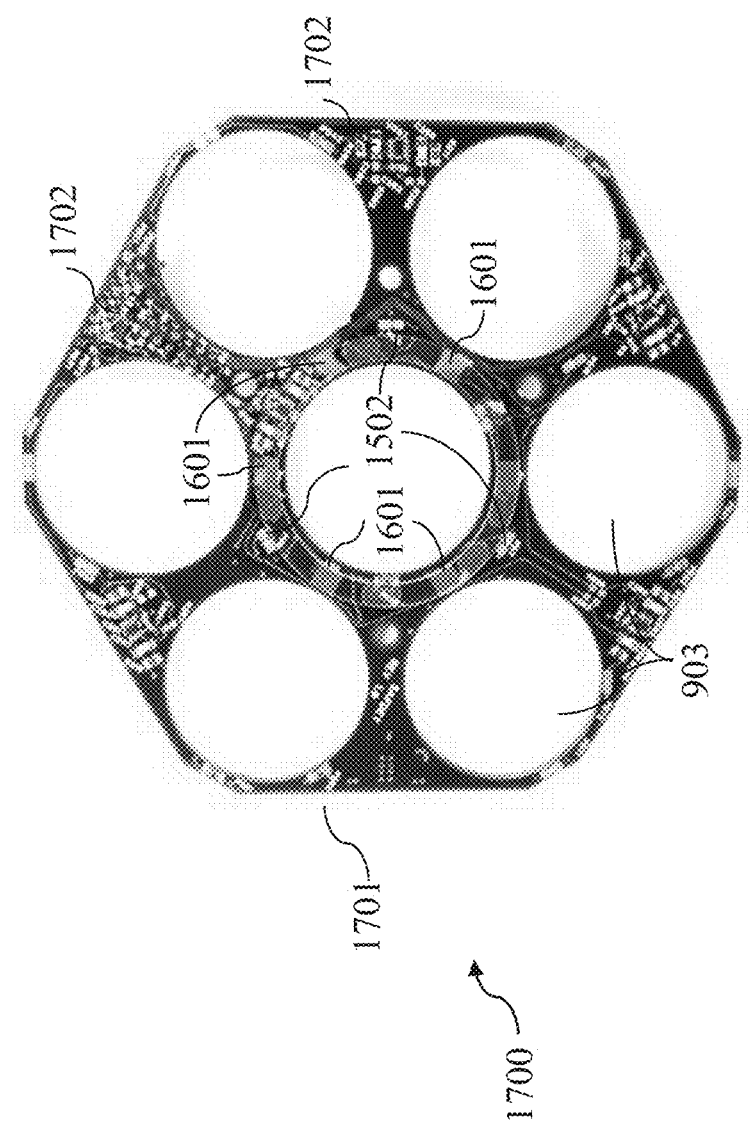
FIG. 17 shows a front elevation view of an exemplary BTI-AG sensor of the present disclosure including the grating unit of FIG. 16.

FIG. 16 and FIG. 17 illustrate an exemplary BTI-AG sensing system designed for the seven-beam fiber array laser head in FIG. 2B. The BTI-AG sensing system in FIG. 17 includes an integrated grating unit (1600), which is illustrated in more detail in FIG. 16. The grating unit (1600) is composed of six sets (1601) of binary amplitude gratings manufactured on an annular glass plate (1602). The integrated BTI-AG sensing system (1700) in FIG. 17 includes the grating unit (1600) attached to an electronic board (1701) with six photo-detectors (not visible) located behind the amplitude gratings (1601) and the supporting electronic circuitry (1702). The electronic board (1701) has seven holes (903) whose centers coincide with the optical axes of the seven laser beams (100.4).

As FIG. 16 illustrates, each set of gratings (1601) consists of three identical grating segments (1603) having a distance of 600 µm from each other and surrounded by blocking light areas (1604) in order to ensure that light only reaches the photodiode through one of the grating segments. Note that three grating segments instead of one single grating segment are used to mitigate the impact of possible mutual misplacement of the gratings and photodiodes. To increase the tolerance of the BTI-AG sensing system to angular misalignment of the BTI fringes and gratings, the grating segment dimension parallel to the interference fringes in FIG. 16 is made a factor of 5 smaller.

Figure 18:
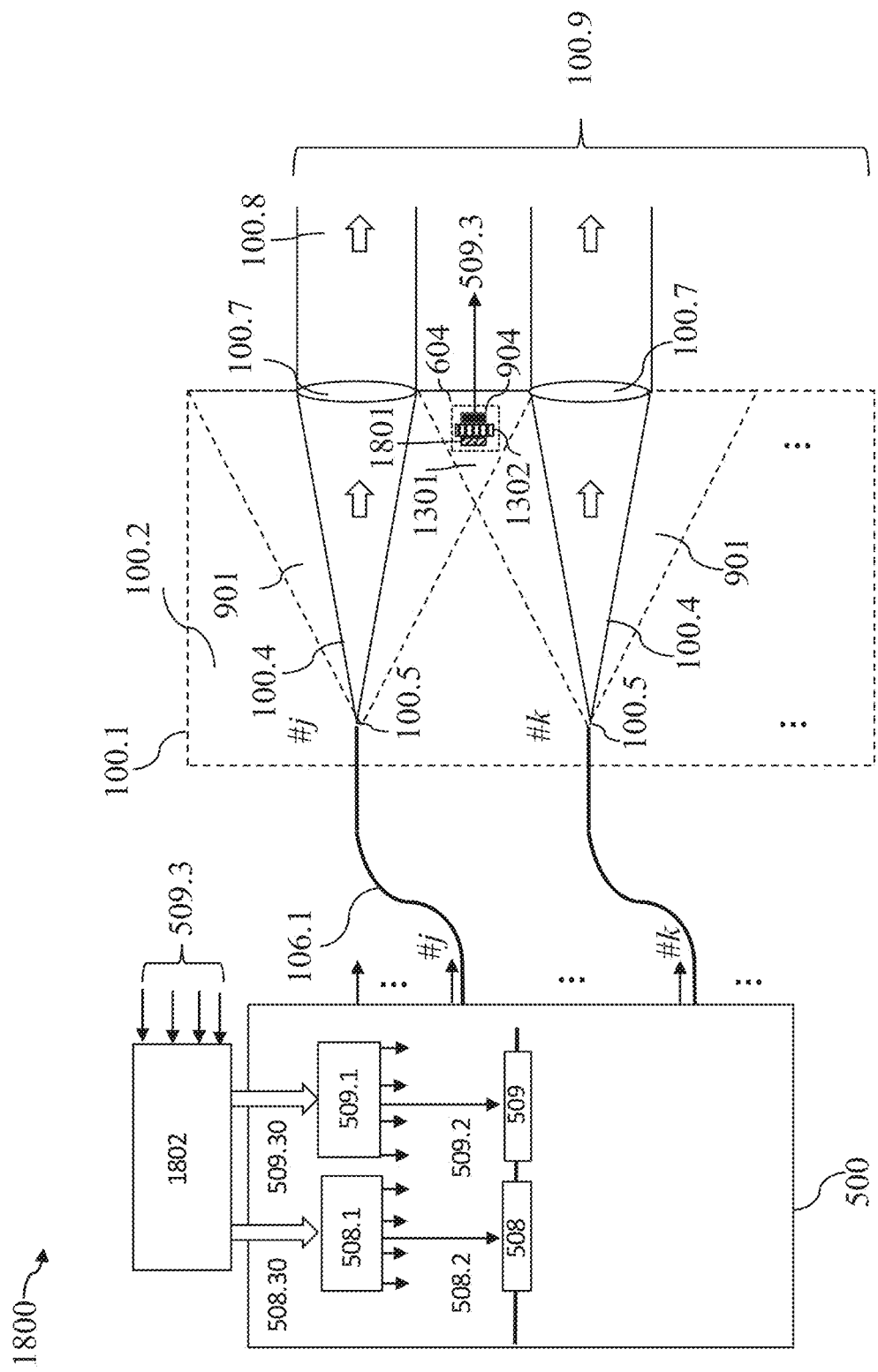
FIG. 18 is a schematic diagram of an exemplary fiber array system of the present disclosure with combined beam tail phase and polarization sensors.

Methods for near-field phase and polarization locking using beam-tail sensors (BTI-AG-CPP technique): The disclosed BTI-AG sensing and control method and other similar systems and methods may be extended to include additional capabilities for co-alignment of transmitted beam polarization states (polarization locking). The combined piston phase and polarization (CPP) BTI-AG sensing and control method and system (1800) is illustrated in FIG. 18. The sensing module (604) contains a linear polarizer (1801) that is placed in front of the amplitude grating (1302), This sensing module (604) is referred to here as the BTI-AG-CPP sensor, Note that the polarizer (1801) may be optionally placed behind the amplitude grating (1302) and either a single or many photo-detectors may be used. In this sensor, the signal (509.3) $J_{j,k}(t)$ registered by photo-detector (904) depends on the difference in both the piston phases $\delta_{jk}(t)$ and polarization states of the adjacent #Jth and #kth laser beams (100.4) and hence can be used for locking of the piston phases and/or polarization states of these beams. For polarization locking of the emitted by the fiber array beams (100.4), each sensor (604) should include a linear polarizer (1801) and all of these polarizers should be identically oriented.

The BTI-AG-CPP control system for the combined beam (100.9) piston phase and polarization locking is illustrated in FIG. 18. The signals $\{J_{j,k}(t)\}$ (509.3), measured using a network of interconnecting subaperture sensors (604), are sent to a signal processing module (1802) that computes the signal components (508.30) and (509.30) that are utilized by the controllers (508.1) and (509.1) to generate the control voltages (508.2) and (509.2) correspondingly applied to the polarization adjusters (508) and phase shifters (509) of the MOPA system (500) of the multi-beam laser source (100.3). The controllers may utilize one or more control techniques such as gradient descent, stochastic parallel gradient descent (SPGD), decoupled SPGD, etc.

Methods for near-field polarization sensing and control using beam-tail polarization sensors (BTP technique): With utilization of sensors such as the BTI-AG-CPP sensors, as described above, phase and polarization control channels can be strongly inter-dependent (coupled). The visibility of beam tail interference fringes and hence SNR in the $\{J_{j,k}(t)\}$ signal measurements is low unless the polarization states of adjacent beams are sufficiently well co-aligned. This means that in the CPP control system in FIG. 18, phase locking process convergence can be strongly dependent on the performance of the polarization locking control system. This coupling between the control channels of the phase and polarization locking feedback systems may result in a significant slowdown of the corresponding phase and polarization locking processes. To speed up convergence and thus increase the operational frequency bandwidth of the phase and polarization locking systems, it may be beneficial to decouple the phase and polarization feedback control loops.

Figure 19:
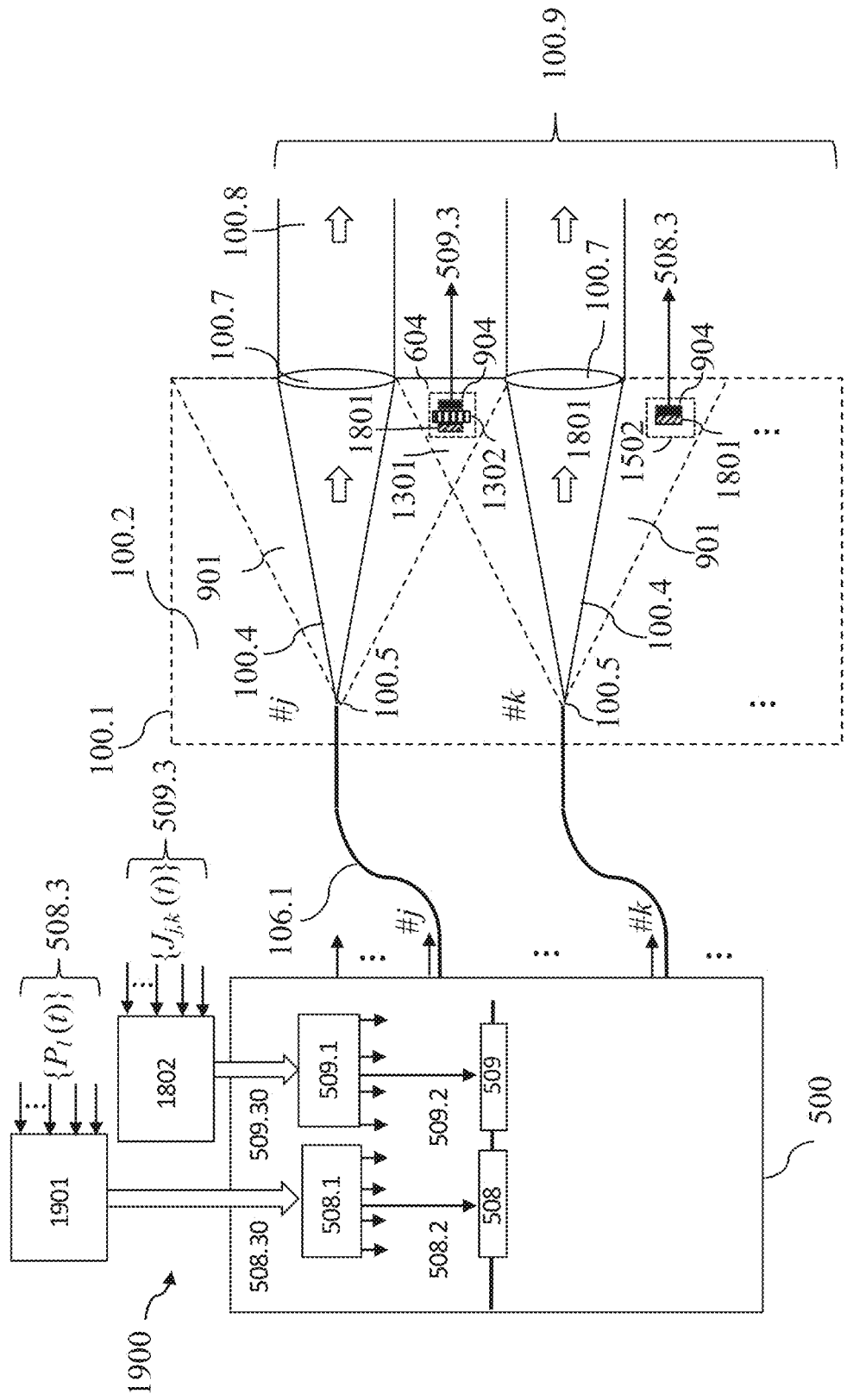
FIG. 19 is a schematic diagram of an exemplary fiber array system of the present disclosure with BTI-AG and beam tail polarization (BTP) sensors.

In the beam tail polarization (BTP) sensing and control method disclosed, decoupling of the piston phase and polarization control systems is achieved using a network of BTP sensors (1502) as illustrated in the system (1900) FIG. 19. Each BTP sensor (604) is composed of a photo-detector (904) with a linear polarizer (1801) located in front of it. All polarizers of the IP sensors (604) in the fiber array laser head preferably have polarization axes that are parallel to each other. These sensors (604) may be located in the overlapping regions (1301) of beam tails (901) including regions with overlapping of two (1301) and/or three beam tails, or may be outside the beam tail overlapping areas. FIG. 15 illustrates a network of BTP sensors (1502) (marked as A through F) that are located in the overlapping regions of three beam tails along with the network of BTI-AG sensors (1501).

For practical reasons both BTP and BTI-AG sensors may be integrated into a single polarization and piston phase sensing module as illustrated in FIG. 15 and FIG. 17, or each sensor type may be integrated into two different modules. In FIG. 15 the 1311-AG sensors (1501) are located in the middle between two hexagonally shaped adjacent holes (903) that the laser beams (104) pass through, while the BTP sensors (1502) are at the centers of triangles formed by three adjacent holes. Note that in the case of BTP sensor location inside the overlapping regions of two or three beam tails, the signal measured by these sensors depends on the piston phases of the corresponding laser beams (overlapping beam tails). To reduce the impact of piston phase variations on the signals measured by the BTP sensor and thus decouple the polarization and piston phase control channels, the photo-detector size $d_{PD}$ of the BTP) sensors should be significantly larger than the characteristic feature size w of the beam tail interference patterns at the sensor locations ($d_{PD} \ggg w$). Here w (on the order of a few microns) corresponds to fringe width for the two-tail interference pattern, and the spot size of the multi-spot grid for the three-tail interference pattern. For $d_{PD} \gg w$ (for example $d_{PD}$ on the order of 1.0 mm as in FIG. 17) the impact of piston phases on the BTP sensor signals vanishes due to interference pattern averaging over the photo-detector apertures. This allows decoupling of the piston phase and polarization locking control systems, providing implementations with a significant increase of operational speed and accuracy in the phase and polarization locking systems.

FIG. 19 illustrates the disclosed control method for polarization state locking based on the BTP sensors. The signals (508.3) $\{P_m(t)\}$, where m=1, . . . , $M_P$, are measured by $M_P$ BTP sensors (1502) and then sent to a signal processing module (1901) that computes the signal components (508.30) utilized by the controllers (508.1) to generate the control voltages (508.2) applied to the polarization adjusters (508) of the MOPA system (500). The controllers (508.1) may be based on optimization performed in parallel of either the directly measured signals $\{P_m(t)\}$ or various combinations of these signals. This optimization may be performed using one or more control techniques such as multi-dithering (LOCSET), gradient descent, stochastic parallel gradient descent (SPGD), decoupled SPGD, etc.

Methods for combined near-field piston phase and polarization locking with BIT-AG and BTP sensors (decoupled PPP locking technique): FIG. 19 illustrates a technique for decoupled near field piston phase and polarization (PPP) locking based on the BTI-AG and BTP sensors. An example configuration of the sensing unit is illustrated in FIG. 15. The sensing unit is shown as being composed of 18 BTI-AG and 7 BTP sensors, which provide both phase and polarization locking of 19 beams emitted by a fiber array laser. The measured signals $\{J_{j,k}(t)\}$ for the BTI-AG and $\{P_m(t)\}$ for the BTP sensors are sent to the corresponding signal processing modules (1802) and (1901) that compute the signal components (509.30) and (508.30) utilized by the controllers (509.1) and (508.1) to generate the control voltages (509.2) and (508.2) correspondingly applied to the phase shifters (509) and polarization adjusters (508) of the MOPA system (500). Each control system may utilize one or more of the control algorithms mentioned above. Since the polarization locking control system is not affected by variations in piston phases (decoupled), convergence of both control systems occurs faster than in the corresponding combined phase and polarization locking system based solely on the BTI-AG-CPP sensors.

Methods for near-field piston phase and polarization sensing and control with reflective diffraction gratings (BTI-DG technique): Performance of the near-field phasing methods described above could be affected by cladding and stray light, higher order modes, and residual pump light. All of these unwanted light components may be present in the emitted laser beams, negatively affecting the SNR of measured signals by adding additional noise. Another potential challenge may be associated with the need for routing a number of electrical wires connecting sensing modules with the corresponding controllers (e.g., (1901) and/or (1802)). Being in the close vicinity of high power laser beams, the connecting wires need to be well protected from the heat generated by clipped light, which may represent a certain engineering challenge especially for HP and EHP fiber array systems having a large number of subapertures.

Figure 20:
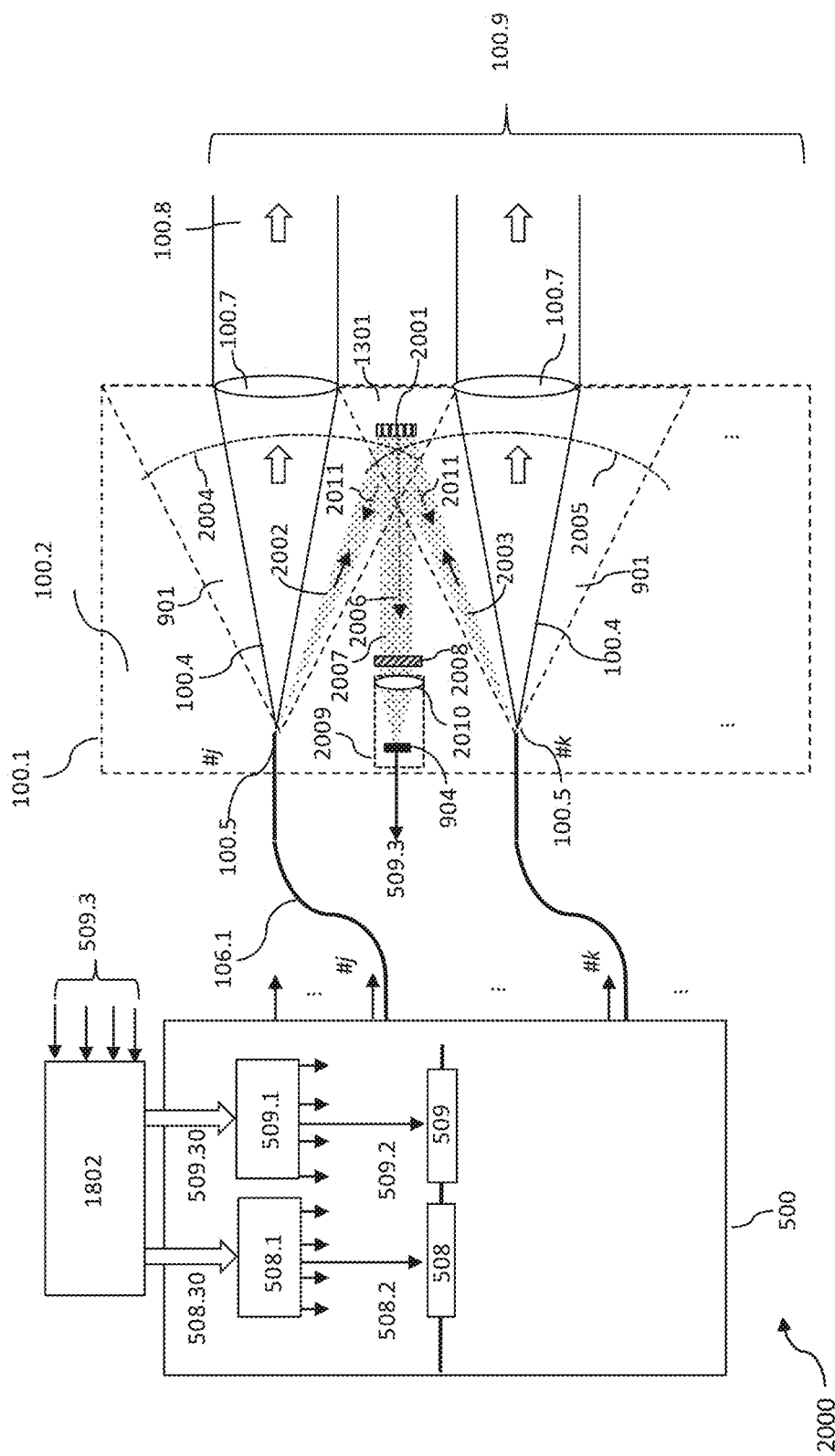
FIG. 20 is a schematic diagram of an exemplary fiber array system of the present disclosure with an exemplary beam tail interference sensor based on a reflective diffractive grating (BTI-DG).

The challenges mentioned above are resolved in the near field phase and/or polarization sensing methods disclosed here, referred to as BTI-DG sensing, that utilize reflective diffraction gratings to produce an interference fringe pattern originating from adjacent beam tails at the sensor's receiver photo-detector or photo-array. FIG. 20 illustrates a system (2000) with the disclosed BTI-DG sensing technique using exemplary two adjacent jth and kth subapertures (100.2) of a fiber array laser head (100.1). In the BTI-DG sensing method a relatively small (few millimeters) reflective diffraction grating (2001) is placed in the center of the overlapping regions (1301) of adjacent beam tails (901). The grating is illuminated by the beam tail light components (2002) and (2003) as illustrated in FIG. 20. Within the diffraction grating (2001), the parabolic wavefront phases (2004) and (2005) of the laser beams (100.4) emitted through the fiber tips can be accurately approximated by wavefront tip and tilts phase components corresponding to incident angles for the jth, and for the kth subapertures. With accurate mutual alignment of the laser beams and diffractive grating the incident angles have equal modules and opposite signs: Here the incident angle depends on the fiber array pitch l (distance between adjacent fiber tips) and distance f between the fiber tip and diffraction grating. Note that in the case when each fiber collimator (100.2) of the fiber array laser head (100.3) is composed of several beam forming optical elements, the parameter f corresponds to the distance between the diffraction grating and virtual waist of the diverging beams emerging from the fiber tips.

It is well known that a reflective diffraction grating transforms incident light into a set of discrete reflected light components known as diffraction orders. The diffracted light components propagate along discrete angular directions known as diffraction angles { }, where the index, defines the diffractive order. The diffraction angles { } can be calculated from the following well-known formula: where λ is wavelength and is the diffraction grating period. In the disclosed BTI-DG sensing technique the diffraction grating period is selected from the condition. Under this condition the first (m=1) and minus first (m=−1) component (first and minus first diffraction orders) of each beam tail propagate along a common optical axis (2006) that is parallel to the optical axis of the fiber collimators (100.2) that the laser head (100.1) is composed of. The diffracted beam tail laser light components (2007) pass through a polarizer (2008) and an optional lens (2010), and enter the sensing module (2009) composed of a photo-receiver (904), e.g. a photo-detector or a photo-detector array. The lens (2010) may be used to increase SNR by increasing the power density of the diffracted light components (2007) within the photo-receiver (904). When optical carrier frequencies of the adjacent beams coincide (are locked), the signal $J_{j,k}$ (t) registered by the photo-receiver depends on the piston phases and polarization states of the adjacent #jth and #kth laser beams (100.4) and, hence, may be utilized for piston phase and/or polarization state locking of these beams. Similar to the disclosed decoupled piston phase and polarization (PPP) locking technique, polarization state locking could be performed separately using a network of BTP sensors. When the BTI-DG sensors are utilized for both piston phase and polarization locking each sensing module (2009) of the fiber array laser head (100.1) should include identically oriented linear polarizers (2008). To decrease undesired coupling of the zero-order (m=0) diffraction components (2011) of the beam tail light to the fiber tips (100.5) and, at the same time, increase optical power of the first-order diffraction components (2007) entering the sensing module (2009), the grating (2001) may be designed as a phase-type reflected diffraction grating using conventional technology. The use of phase diffraction gratings in the BTI-DG sensors may provide the desired suppression of the zero-order diffraction components (2011) and enhance light power of the first-order diffraction components (2007) entering photo-receiver (904), thus resulting in better SNR in signal measurement.

Figure 21:
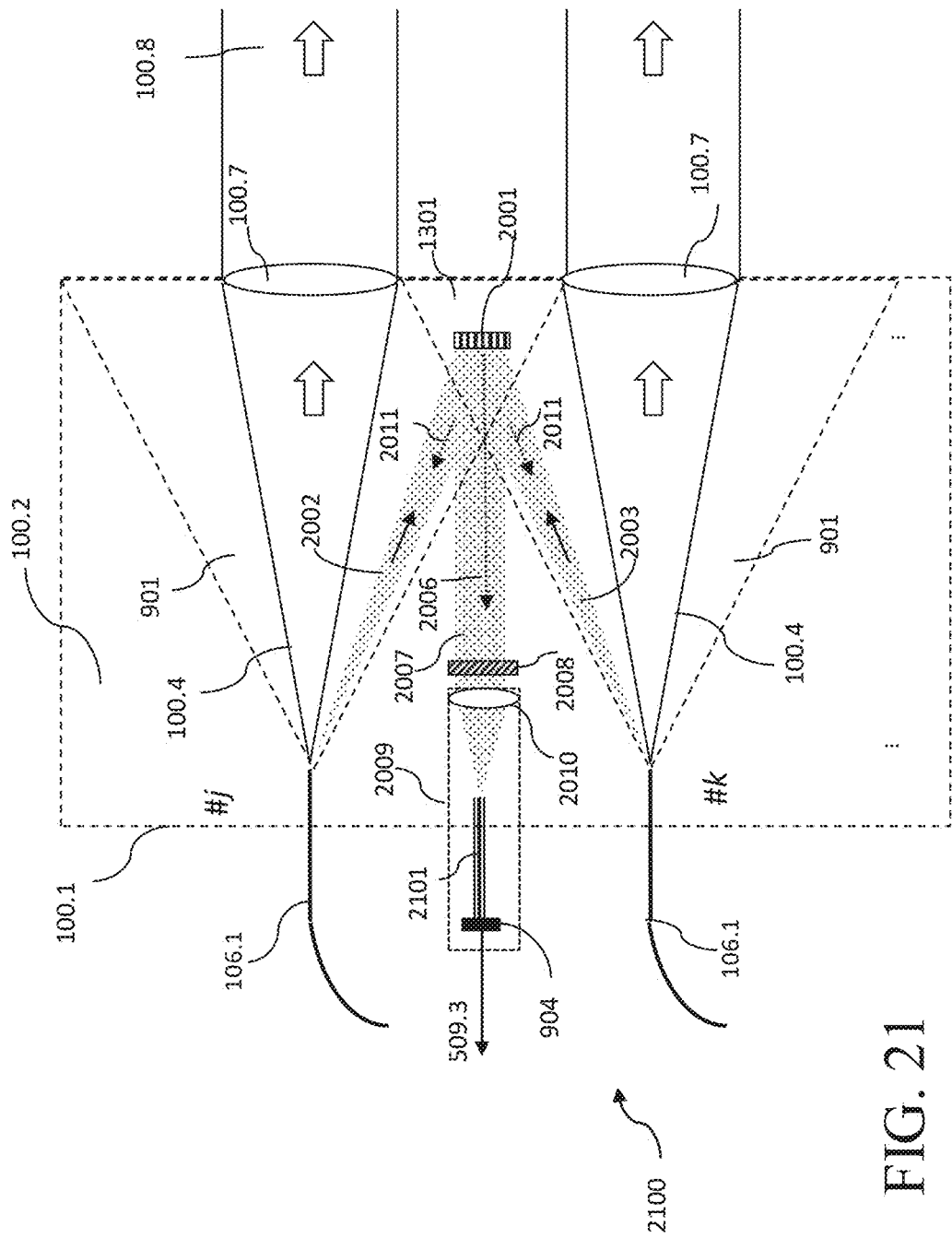
FIG. 21 is a schematic diagram of an exemplary BTI-DG sensor of the present disclosure with remotely located photodetector.

To reduce the impact of environmental factors including stray light and heat generated Inside the fiber array laser head, it may be advantageous to relocate the photo-receiver (904) and the corresponding connecting electrical wires of the BTI-DG sensors to outside the laser head (100.1). This may be achieved by coupling the first-order diffraction laser light components (2007) into a single mode fiber or coherent fiber bundle (2101) that delivers the sensing light to the photo-receivers (904) that are located outside the laser head. This BTI-DG sensing module option is illustrated in FIG. 21. Note that the photo-receivers (904) in FIG. 20 and shown in the system (2100) of FIG. 21 may be based on a single pixel photo-detector that measures the output signals $\{J_{j,k}$ (t)$\}$, or on a photo-array (e.g. CCD camera) that captures the intensity distributions $\{J_{j,k}$ (r,t)$\}$ of interference patterns formed by the first and minus first beam tail components (2007) diffracted off the grating (2001). Here r={x,y} is a vector in the photo-array plane of each BTI-DG sensing module. The signals $\{J_{j,k}$ (t)$\}$ and/or $\{J_{j,k}$ (r,t)$\}$ measured by a network of the BTI-DG sensors may be utilized for near-field phase and/or polarization locking using known control algorithms, e.g. multi-dithering, SPGD, decoupled SPGD, gradient flow, etc.

Some advantages of the disclosed BTI-DG sensing techniques in comparison with sensing methods that utilize one or another assembly of off-axis mirrors (e.g., such as described in FIG. 11 and FIG. 12) are less strict requirements on accuracy in mutual alignment of sensing system components and use of reflective gratings that mitigate the impact of the undesirable light components that may be present inside beam tail region including cladding and stray light, higher order modes and residual pump light. All of these laser light components do not satisfy the specific requirements on wavefront incident angles (e.g.,) for which an implementation of the diffraction grating may be designed, thus resulting in effective filtering of these unwanted light components in the sensing light and improvement of SNR in the measured signals.

Methods of angular co-alignment of beamlets emitted by fiber array: The disclosed BTI-DG sensing technique provides a means for angular co-alignment of the beamlets transmitted by the fiber array, which may be required for both incoherent and coherent beam combining at a remotely located target aiming laser power density increase at the target aimpoint vicinity. The optical axis of the emitted beamlets may be angularly misaligned due to several factors, including but not limited to: (a) insufficient accuracy in manufacturing and integration of optical and mechanical elements of the fiber array laser head; (b) heat-induced optical and mechanical disturbances at the end sections of the delivery fibers and fiber tips; (c) thermo-mechanical deformations of mounting holders and/or beam forming optical elements inside the fiber array.

The method for angular co-alignment of the emitted beamlets disclosed herein is based on feedback control of transversal (with respect to a beamlet's optical axis) displacements of either the delivery fiber tips and/or optical elements of the beam forming optical system. This feedback control is achieved using the sensors signals $\{J_{j,k}$ (t)$\}$ and/or $\{J_{j,k}$ (r,t)$\}$ measured by a network of the BTI-DG (and/or BTI-AG) sensors.

Figure 22:
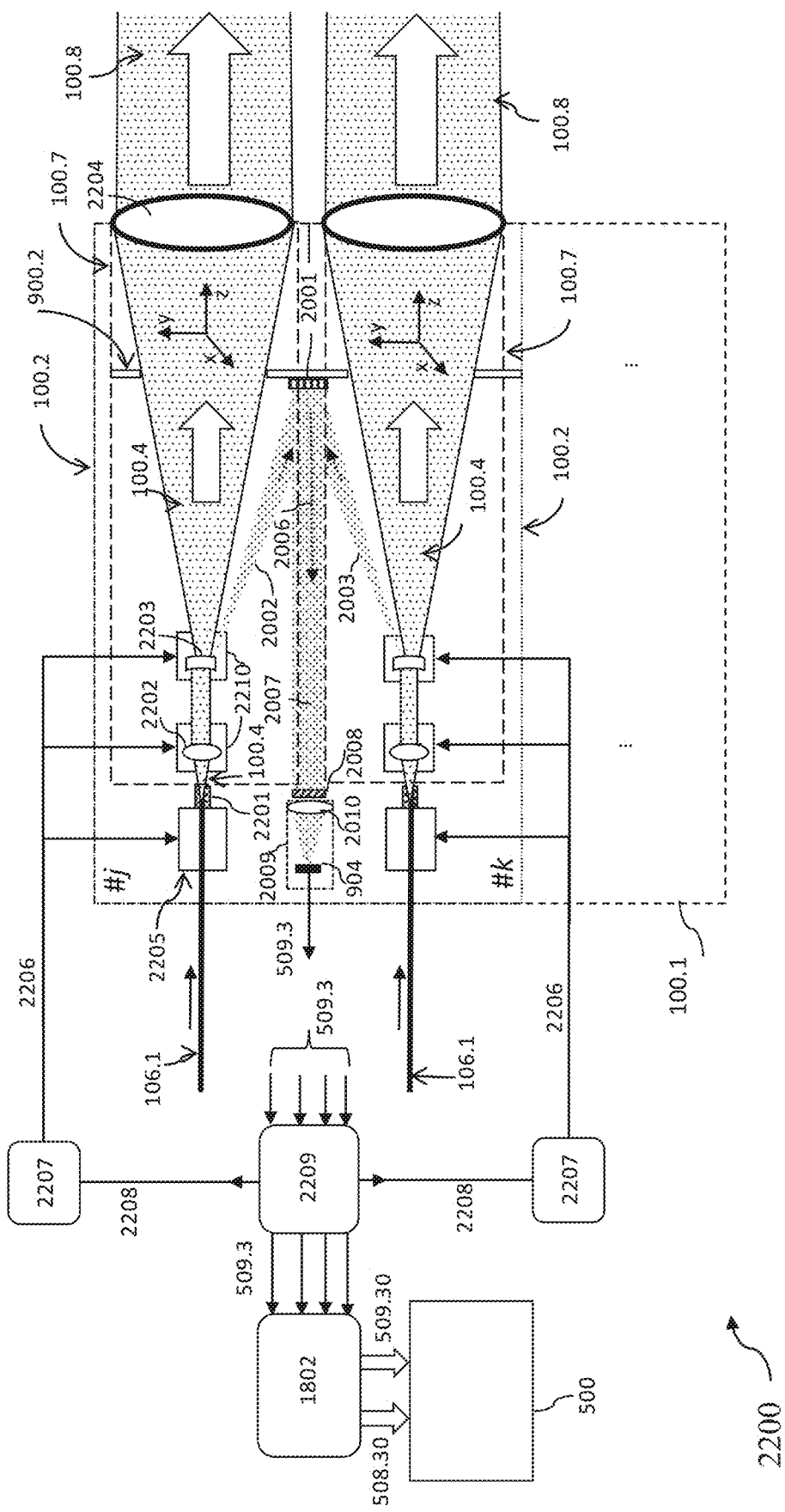
FIG. 22 is a schematic diagram of an exemplary fiber array system of the present disclosure with beamlet angular co-alignment system.

The system (2200) of FIG. 22 illustrates an example of a beamlets' angular co-alignment method showing two (#jth and #kth) identical adjacent subapertures (100.2) of the fiber array laser head (100.1). The beam forming optical system (100.7) in FIG. 22 transforms the laser beam (100.4) that is emitted from the tip (2201) of the delivery fiber (106.1, 106.2) into a collimated output beamlet (100.8). The example beam forming system (100.7) is composed of three lenses: a small collimating lens (2202), a negative lens (2203) and the output lens (2204). In the method disclosed, for angular co-alignment of the transmitted laser beams, the end piece of delivery fiber (100.6) with the fiber tip (2201) may be assembled inside a fiber-tip positioning module (2205) designed to electronically control the fiber tip's x- and y-displacements orthogonal to the laser beam propagation direction (along the z-axis). Because the fiber tip (2201) is located in the focal plane of the collimating lens (2202), its transversal displacement causes wavefront tip and tilt deviations of beamlets (100.8) transmitted through the fiber array laser head. The fiber-tip's x- and y-displacements are achieved using electrical signals (2206) that are generated in the fiber-tip positioning controller (2207) in response to the control signals (2208). These signals are computed by the co-alignment processor (2209) based on the output signals (509.3) provided by the network of BTI-DG sensing modules (2009).

Angular co-alignment of the transmitted laser beams can be also be implemented using a lens positioning module (2210) capable of high precision controllable x- and y-displacement of a positive (2202) and/or negative (2203) lens of the beam forming optical systems (100.7) in the plane orthogonal to the laser beam propagation direction. The lens x- and y-displacements result in the outgoing beam's wavefront tip and tilts, leading to angular deviation of the transmitted laser beam propagation direction.

Angular misalignments of adjacent beamlets result in the deviations and of the incident angles of the beam tails (2002) and (2003) entering the diffractive grating (2001) from the preset value the gratings are designed for. Due to high angular selectivity of the diffractive gratings, these angular deviations result in a decrease in optical power of the first-order diffraction components (2007) of the light entering photo-detector (904) and, hence, affects the sensor output signal (509.3) [$J_{j,k}$ (t) or $J_{j,k}$ (r,t)]. Correspondingly, the output signals (509.3) of the photo-detectors (904) can be utilized for the characterization of angular co-alignment of adjacent beamlets in the fiber array laser head via computation of various co-alignment performance metrics { } and/or $K^{al}$ (t) by the near-field co-alignment processor (2209).

Dependent on the control algorithm used, the beamlets' co-alignment processor (2209) may be composed of a single processor optimizing a single co-alignment metric $K^{al}$ (t), e.g. a cumulative sum of signals $\{J_{j,k}$ (t)$\}$, or a set of independently operating processors optimizing individual metrics { } that characterize co-alignment performance of the corresponding adjacent (#jth and #kth) beamlets, e.g. metrics that are dependent on (e.g. proportional to) the output signals $\{J_{j,k}$ (t)$\}$ from the corresponding BTI-DG sensors, or a combination of both. This metric(s) optimization can be based on known techniques that may include but are not limited to gradient descent, SPGD, decoupled SPGD, multi-dithering, simulated annealing, etc.

To increase sensitivity to angular misalignments, the photo-detector (904) may be positioned at the focal plane of the collecting light lens (2010) and also may have a small (on the order of the Airy disk diameter) diaphragm (mask) in front of it.

Figure 23:
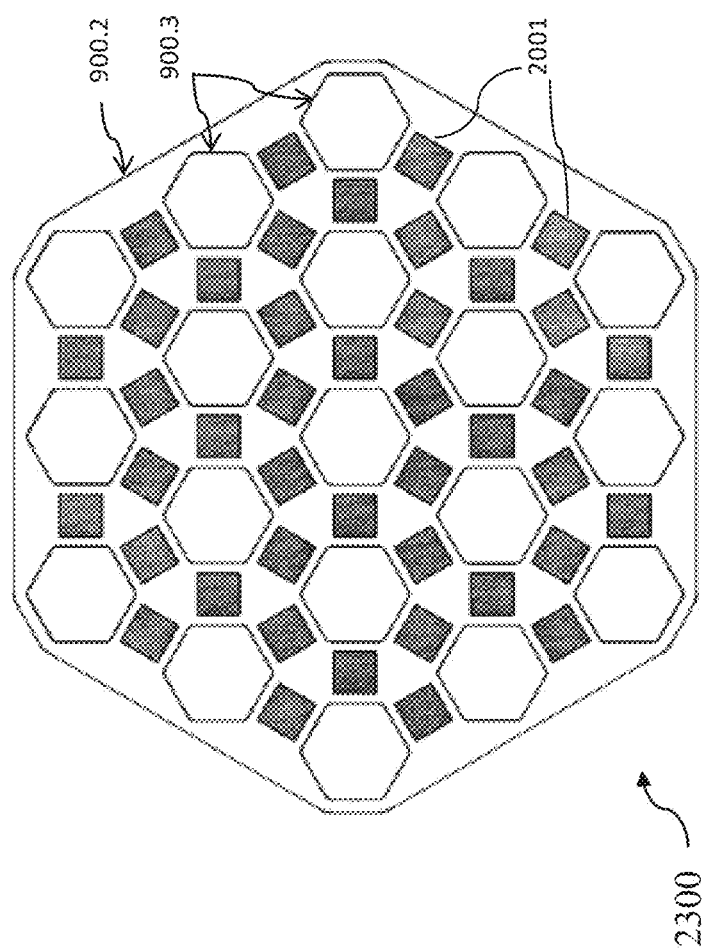
FIG. 23 is a front elevation view of an exemplary substrate of the present disclosure with diffractive gratings of BTI-DC sensors for a fiber array laser head with 19 subapertures usable with the systems of FIGS. 20, 21 and 22.

Performance of the co-alignment control system may be improved through suppressing the sensor's output signal fluctuations caused by interference of the first-order diffraction laser light components (2007) at the photo-detector (904). This may be achieved, for example, via one (or all) of the following means: (a) temporal filtering of the interference-induced fluctuations of the output signals (509.3); (b) interference suppression using high frequency (on the order of several M Hz) randomization of beamlet piston phases with the phase shifters (510) of the MOPA system (500); (c) decrease of beamlets' temporal coherence by increasing the frequency band of the line-broadening system (503), (504) of the MOPA system; (d) existing or intentionally induced deviations of the optical carrier frequencies in the fiber channels using optical path difference adjusters (507) of the MOPA system; (e) existing or intentionally induced randomization of polarization states with the polarization adjusters (508) of the MOPA system. In reference to the above, (b) through (e) lead to incoherent combining of the first-order diffraction laser light components (2007) at the photo-detectors (904) of the BTI-DG sensing modules (2009). They are applied prior to beamlets' phasing to mitigate static, and/or quasi-static beamlets' angular misalignments that are the most common for HP and EPH fiber array laser systems. Note that beamlet co-alignment depends on accuracy in manufacturing and mutual positioning and orientation of the diffractive gratings (2001) of the BTI-DG sensing modules. Such high accuracy may be achieved by manufacturing all diffractive gratings (2001) of the fiber array laser head (100.1) on a single substrate (900.2) using, for example, high resolution microlithography. FIG. 23 illustrates a schematic (2300) of a substrate (900.2) with reflective gratings (2001) that surround 19 hexagonal holes (903) whose centers coincide with the optical axes of the beams (100.4). This mask with diffractive gratings is positioned inside the fiber array laser head (100.1) prior to the collimating lenses (2004) of the beam forming optical systems (100.7) as illustrated in FIG. 22.

Methods for optical path length matching in coherent fiber array laser systems: The disclosed BTI sensing techniques can be utilized for equalization (matching) of optical path lengths in the fiber channels of coherent fiber array systems. Optical path length matching (OPLM) in the fiber channels of the MOPA system, also referred to as optical path length difference (OPLD) compensation or optical carrier frequency locking, may be required for mutual phasing (phase locking) of the transmitted beamlets, either at the exit pupil (near field phasing) and/or at a remotely located target (target phasing). Variations in optical carrier frequencies between different fiber channels, which may be caused by environmental factors (e.g. fluctuations of temperature and vibrations), result in a strong decrease, or even disappearance of the measured signals (509.3) dependence on of piston phase errors $\{\delta_{jk}$ (t)$\}$ which is used for phasing of beamlets having co-aligned polarization states. The signal $J_{j,k}$ (t) and/or registered by each BTI sensor may be represented as a sum of two components: and/or, where and are correspondingly a quasi-static sensing signal components that are solely dependent on the laser powers of the adjacent (jth and kth) laser beams measured by a sensor's photo-receiver (904), and the relatively fast changing (AC) signals and dependent on both the piston phase error $\delta_{jk}$ (t) and deviation in the optical carrier frequencies $\Delta\omega_{jk}$. The latter sensing signal components may be represented in the form and where the factor, known as interference signal visibility, rapidly declines with increase in $\Delta\omega_{jk}$ and reaches a maximum when the OPLDs are compensated ($\Delta\omega_{jk}=0$), In an exemplary case of a point photo-detector (904) located in the plane of beam-tail interference (e.g. in the absence of lens (2010) in FIG. 20 and for co-aligned polarization states) the measured signal describes the typical time dependence of photo-current modulation in a single point of the two-beam interference pattern: where and are controllable piston phases resulting in control voltages applied to the phase shifters (509) of the MOPA system (500).

Some implementations of method of optical path length matching in the coherent fiber array system disclosed herein are based on feedback control of the MOPA system's (500) OPD adjusters (507) by maximizing visibilities of the beam tail interference signals. This feedback control is performed by processing the signals (509.3) ($\{J_{j,k}$ (t)$\}$ and/or $\{J_{j,k}$ (r,t)$\}$) that are measured with a network of the BTI-DG (and/or BTI-AG) sensors. This processing may include filtering of quasi-static (DC) sensing signal components { } and, or { } e.g. using digital or analog low-pass filters, and evaluation of the interference visibility factors via analog and/or digital processing of the AC components and by the signal processing modules (1802). The signal processing modules (1802) compute, proportional to, signals (507.30) inputting the controllers (507.1) that generate the control voltages (507.2) applied to the MOPA system's OPD adjusters (507). The controllers (507.1) maximize the interference visibility factors { } using one or more known control algorithms. For performance improvement in the path length matching control systems, additional dithering piston phase modulation signals may be applied to either one or more phase shifters (509) and/or (510). The dithering modulation causes the path matching control system to be less affected by random variations in the piston phases in each fiber channel.

Figure 24:
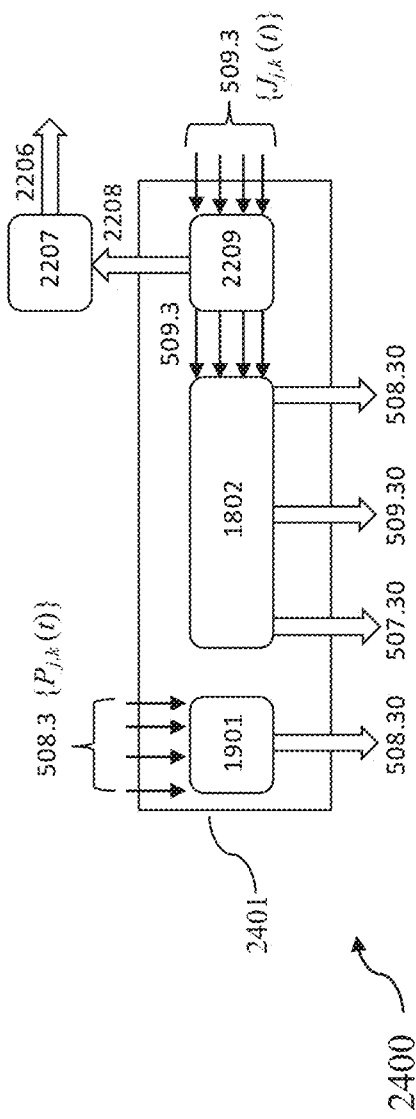
FIG. 24 is a schematic diagram of an exemplary fiber array control module of the present disclosure configured for control of beamlet characteristics.
Figure 25:
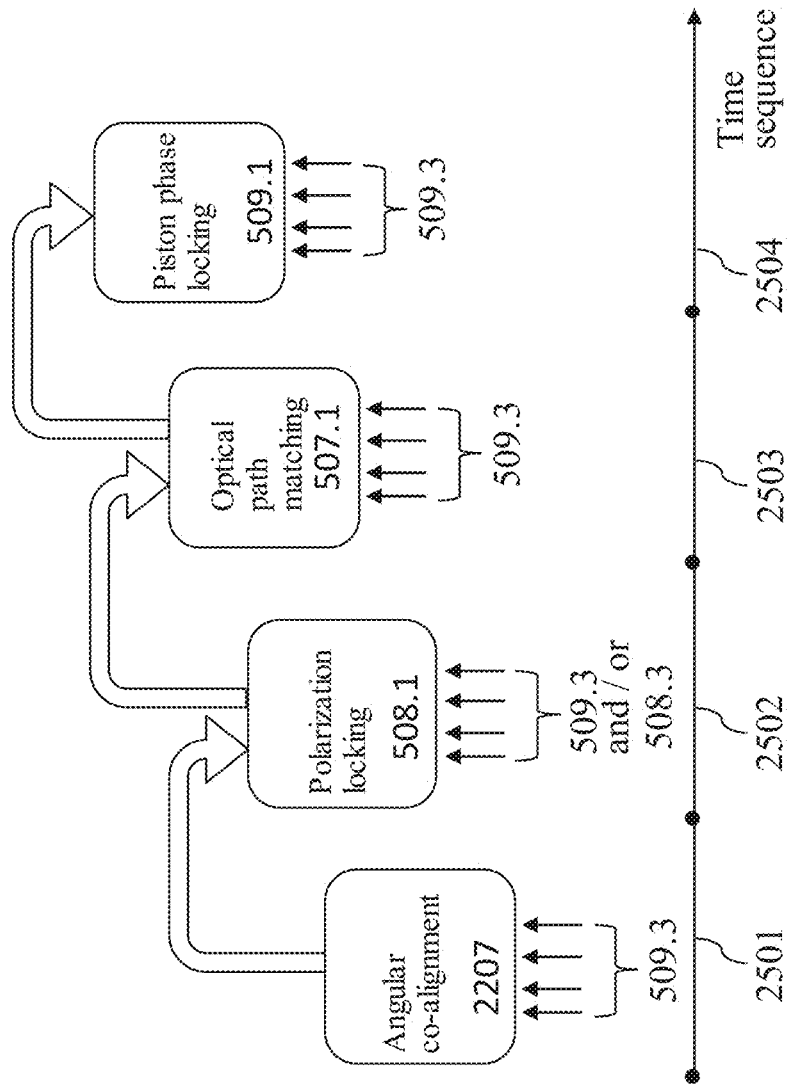
FIG. 25 illustrates an exemplary timeline of the present disclosure for consecutive control of beamlet characteristics.

Methods for consecutive control of beamlet characteristics in coherent fiber array laser systems based on beam tail sensing signals: Near field phasing of beamlets (100.8) that are transmitted through the coherent fiber array laser head (100.1) using beam tail interference (1311) and beam tail polarization (BTP) sensors described above, is most efficient when it is performed in a consecutive order. The measured signals $\{J_{j,k}$ (t)$\}$ (509.3) for the BTI and $\{P_m$ (t)$\}$ (508.3) for the BTP sensors are sent to the corresponding signal processing modules (2209), (1802) and (1901) of the MOPA control module (2401) which compute the signal components (2208), (510.30)(509.30), (508.30) and (507.30) utilized by the controllers (2207), (509.1), (508.1) and (507.1) to generate the control voltages (2206), (509.2), (508.2) and (507.2) correspondingly applied to the fiber-tip or lens positioning modules ((2205), (2210)), phase shifters (509), polarization (508) and optical path difference (507) adjusters of the MOPA system (500) as illustrated in the system (2400) of FIG. 24. For optimal performance, the controllers should be configured to operate in a time sequence that may be comprised of four major phases ((2501) through (2504)) as illustrated in the system (2500) of FIG. 25. The near field phasing control starts from beamlets angular co-alignment (phase 2501) via optimization of metrics based on processing of the BTI signals as previously discussed. The co-alignment of the beamlets leads to increase of quasi-static (DC) sensing signal components and $\{P_m (t)\}$ and provides sufficiently high enough SNR for polarization states co-alignment at the control phase two (2502) using { } and/or $\{P_m (t)\}$ signals. Completion of polarization co-alignment results in increase of sensitivity of the BTI sensors AC component amplitudes to mismatch in the optical carrier frequencies $\{\Delta\omega_{jk}\}$. Correspondingly, the optical path different (frequency locking) controller (507.1) maximizes the AC signal amplitudes by changing optical path lengths with OPLD adjusters (507) at the control phase three (2503). Compensation of OPLDs ($\Delta\omega_{jk}=0$) at the control phase three results SNRs increase of the piston phase locking control systems that optimize one or another types of piston phase control metrics, e.g. minimize square deviations of the measured signals from reference signals. The piston phase locking completes the last (2504) control phase of the coherent fiber array phasing.

Methods for near field and target-plane phasing of coherent fiber array laser system based on retrieval of piston phases from network of BTI sensors. In the method of near field phasing via processing of BTI sensing signals disclosed herein, signal components of BTI sensors are used for retrieval of piston phase error differences, where and are residual piston phase errors corresponding to adjacent #jth and #kth beamlets. Here and, and are correspondingly piston phase noise and piston phase control in adjacent #jth and #kth fiber channels of the MOPA system. The retrieval of piston phase error differences { } from signals can be achieved using one or another signal processing technique.

Figure 26:
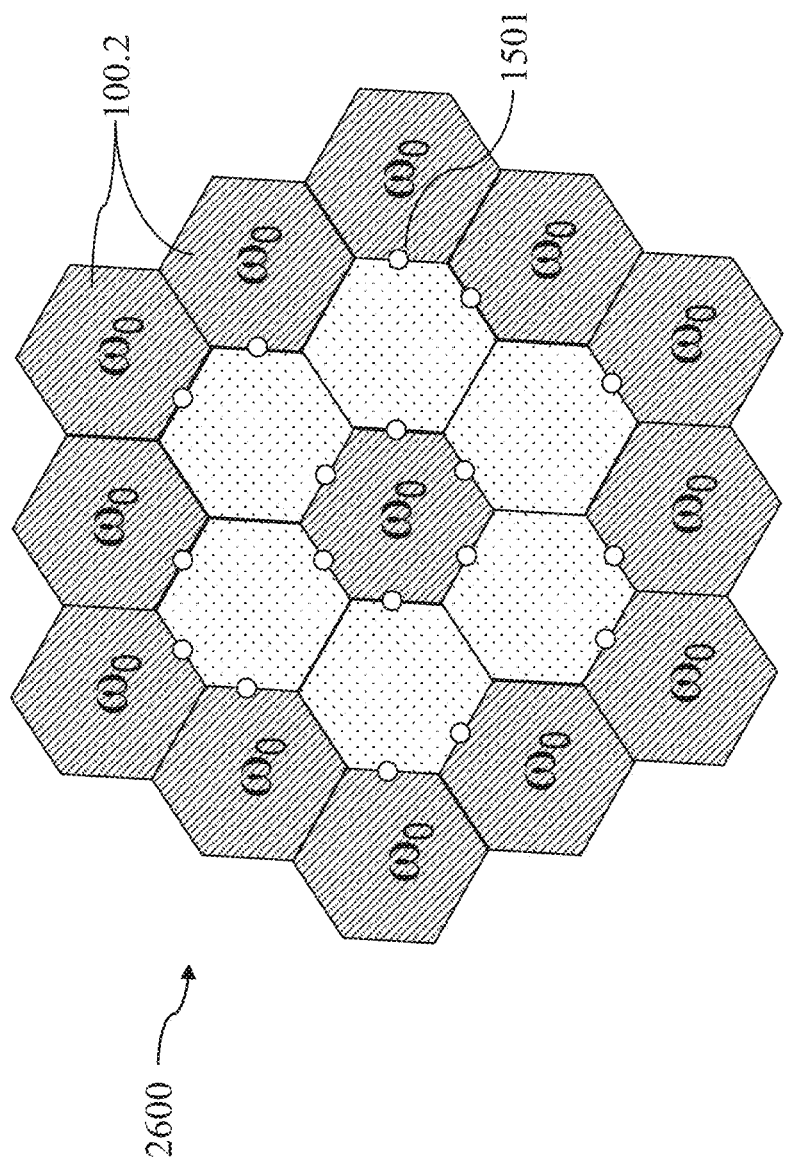
FIG. 26 is a schematic diagram of an exemplary fiber array laser head subapertures configuration of the present disclosure with indication of beamlets with applied dithering signals at frequency $\omega_0$, and positioning of BTI sensors.

In an exemplary case of point photo-detectors (904) located in the center of overlapping regions of two adjacent beam tails as illustrated in FIG. 13, one can use, for example, conventional heterodyne technique that utilizes a small amplitude a (on the order of 0.5rad. or less) piston phase dithering with frequency, commonly ranging from 0.1 MHz to 1.0 MHZ (see FIGS. 7A-7B). In the techniques disclosed, the dithering modulation is applied to one of the adjacent beamlets as illustrated in FIG. 26 using as an example a fiber array laser head (2600) composed of 19 hexagonal shape subapertures (100.2) and a network of BTI sensors (1501) (marked by small circles) coupling all fiber array subapertures. Optical field in one of the two tail sections of each BTI sensor in FIG. 26 is modulated in phase with a dithering signal of frequency. This leads to appearance of spectral components on the dithering frequency and its subharmonics, . . . , in the signals. These spectral components can be separately measured using conventional synchronous detection technique. The amplitudes of these spectral components depend on piston phase error differences { } and can be used for retrieval of residual piston phase errors { }.

An exemplary synchronous detection of spectral components at frequencies and 2 allows extraction (through electronic filtering) of the so-called cosine and sine components of the measured signals, where $a_c$ and $a_s$ are amplitudes that could be either computed or measured, Correspondingly, the piston phase error differences { } can be computed from the synchronously detected signals and using the following expression.

Knowledge of piston phase error differences { } allows retrieval of uncompensated piston phase errors { }= and computation of the controllable piston phases $\{u_j (t)\}$. These piston phases can be introduced into beamlets (100.8) by the phase shifters (509) of the MOPA system (500) by applying the corresponding control voltages (509.2) used for either compensation of piston phase noise signals $\{\varphi_j (t)\}$, or for pre-setting of required (reference) piston phases of the beamlets that are emitted by the fiber array laser head (100.1), These reference piston phases could be needed for compensation of phase aberrations of optical elements placed outside fiber array laser head, and/or introduced by the propagation medium along the path from the fiber array laser head to the target, e.g. atmospheric turbulence-induced piston phase aberrations. These piston phase aberrations could be independently computed for example via processing of the target backscattered light captured by an optical receiver such as for example the power-in-the-bucket (PIB) receiver, or via wavefront sensing of phase aberrations with a wavefront sensor.

The corresponding piston phase control algorithm that could provide computation of controllable phases based on retrieval of uncompensated piston phase errors via processing of BTI sensing signals disclosed herein, maybe represented in one or another form, for example as the following continuous time controller: where τ is a characteristic time response of the near-field phase locking controller. Using sufficiently fast both piston phase controllers (509.1) and phase shifters (509), so that $\tau \ll \tau_{noise}$, where $\tau_{noise}$ is the characteristic correlation time of phase noise in the MOPA channels [defined by the noise signal frequency bandwidth $\Delta\omega$ ($\tau_{noise}=1/\Delta\omega$)], the introduced by the controller piston phase provides compensation of phase noise component and setting the jth bimlet piston phase at a pre-defined value. Note that mitigation of the MOPA-induced phase noise corresponds to setting of all reference phases to zero ({ }=0).

Under conditions of $\tau \ll \min[\tau_{noise}, \tau_{atm}]$, where $\tau_{atm}$ is a characteristic change time of the external to the fiber array piston phase distortions along jth beamlet propagation path to the target, e.g. atmospheric turbulence-induced distortions, the controllers and provides compensation of both phase noise and the external to fiber array piston phase aberrations. Here, j=1, . . . , $N_{sub}$ and $N_{sub}$, is the number of subapertures in the fiber array, With independent sensing of phase distortions e.g. using an external to the fiber array wavefront sensor, the phase controller disclosed can provide coherent combination of beamlets (coherent combining) on a remotely located unresolved target or target glint (target-plane phasing) with simultaneous mitigation of the MOPA system induced phase noise.

Figure 27:
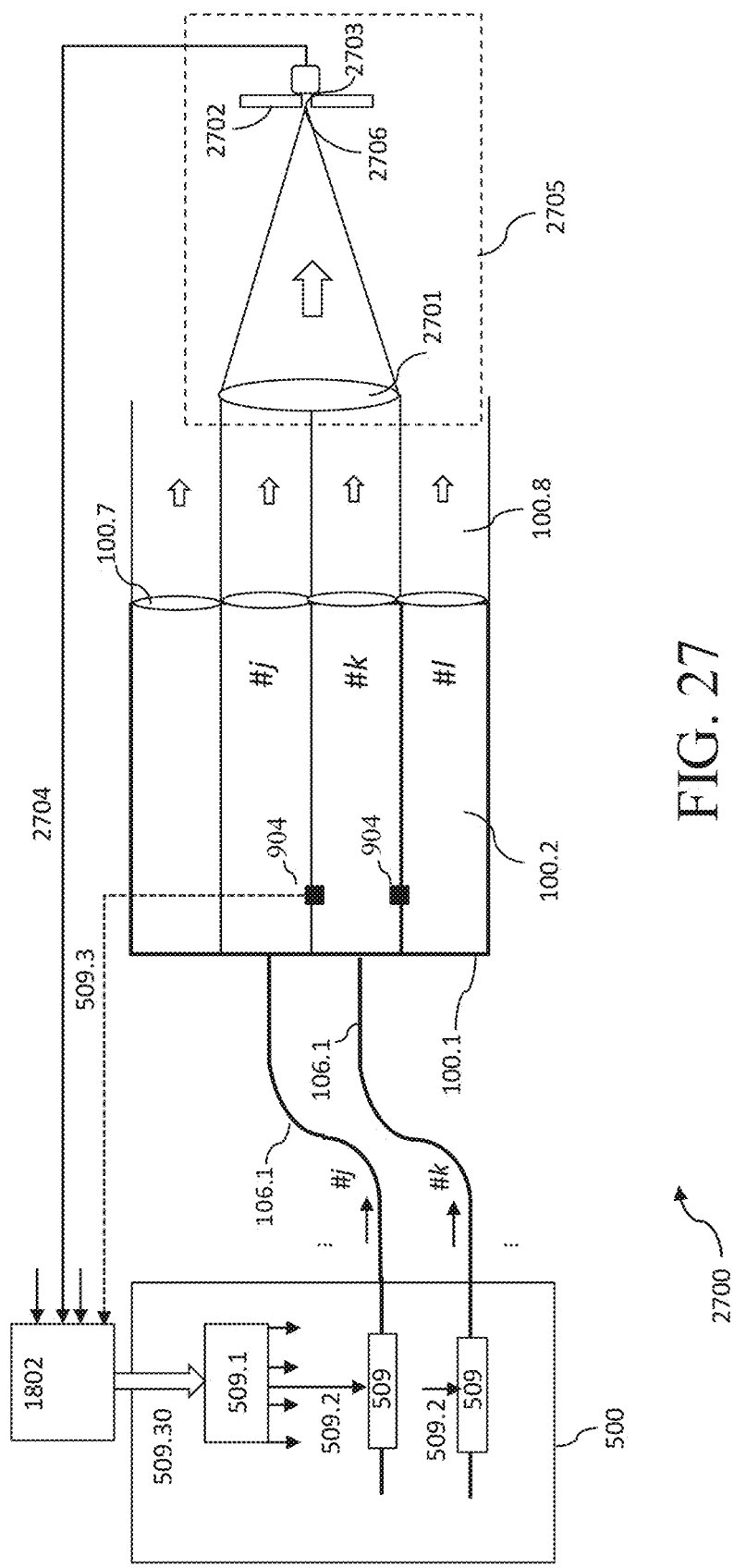
FIG. 27 is a schematic diagram of an exemplary coherent fiber array system of the present disclosure configured to perform a fiber array laser head calibration technique.

Methods for coherent fiber array system calibration via measurements of unsensed piston phase aberrations. As mentioned above, a potential problem for the near field phasing methods and devices disclosed is the unsensed by BTI sensors piston phase aberrations resulting from variations in thickness of optical elements in the beam forming optical systems (100.7) (e.g. collimating lenses) of the fiber array laser head (100.1). This problem can be resolved with a fiber array calibration technique such as that illustrated by the system (2700) of FIG. 27. The calibration module (2705) of the fiber array laser head (100.1) includes an optical system (2701), for example a lens or mirror with sufficiently large diameter to focus at least two or more (e.g. N) beamlets (100.8) into a common focus (2706), a pinhole (2702) that is located in the optical system focus, and a photo-detector (2703) that is located right behind the pinhole. As an example, FIG. 27 shows only calibration of two (#c and #j) fiber array subapertures. The registered photo-detector signal (2704) is sent to signal processing module (1802) that computes the signal components (509.30) utilized by the controllers (509.1) to generate the control voltages (509.2) applied to the phase shifters (509) of the MOPA system (500). Each control system may utilize one or more control algorithms including the mentioned above algorithms such as SPGD, multi-dithering etc. used for phasing of two or more beamlets whose focal sports are combined at the pinhole (2702). Phasing (phase locking) of the corresponding beamlets (100.8) may require their prior angular co-aligned, polarization and optical carrier frequencies adjustment in a consecutive manner described above, what could be performed either using the registered by photo-detector (2703) signal or the beam tails sensors and control techniques disclosed or both.

Figure 28:
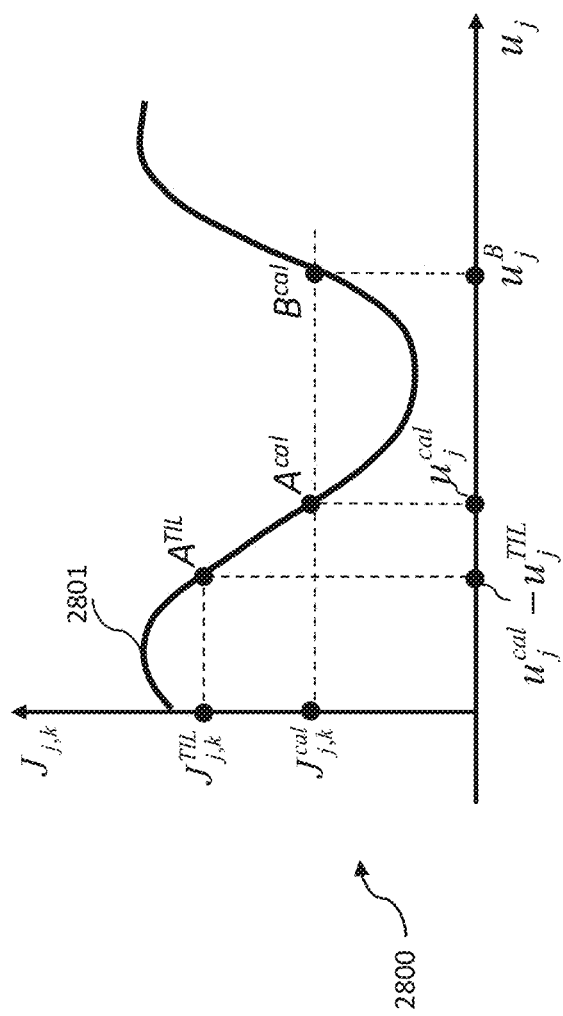
FIG. 28 is an exemplary graph of the present disclosure illustrating the dependence of a measured signal on control voltage.

Phasing of selected for calibration beamlets with the optical arrangement shown in FIG. 27 leads to compensation of unsensed (invisible) by the BTI sensors piston phase aberrations. Once beamlets are phased, photo-detectors (904) of the BTI sensors measure the signals { }, referred to here as calibration signals and the calibration control voltages { } that are applied to the phase shifters (509) in the beamlets phasing conditions. The fiber array calibration may also includes recording of the calibration signal deviations { } in respect to small perturbations { } of control voltages { }, also referred to as the calibration signal derivatives. The calibration signals { } and derivatives { } are recorded by the signal processing module (1802). Under phase locking conditions these signals correspond to compensation of unsensed by the BTI sensors piston phases. FIG. 28 illustrates an exemplary dependence graph (2800) of a measured by BTI sensor signal on control voltage applied to phase shifter of the jth beamlet referred to here as the calibration curve (2801), for fixed piston phase of the kth beamlet. In this illustration point $A^{cal}$ on the calibration curve (2801) corresponds to the measured calibration signal and control voltage under phasing conditions. Note that due to periodical nature of the calibration curve the same calibration signal value may correspond to different control voltage (point $B^{cal}$ in FIG. 28). These two phasing conditions ($A^{cal}$ and $B^{cal}$) can be distinguished with additional measurement of calibration signal derivatives. These signal derivatives in points $A^{cal}$ and $B^{cal}$ have different sign. Thus, recording of both calibration signals { } and their derivatives { } under phase locking conditions allows unique identification of the calibration control voltages { } applied to the phase shifters (509) in the beamlets phasing conditions. These control voltages provide compensation of the unsensed by the BTI sensors piston phase aberrations.

While the calibration signals (and) are recorded for two or more beamlets, the alignment assembly shown in FIG. 27 is re-arranged one or more times to record the calibration signals for the reminding beamlets e.g. by displacing the calibration assembly (2705) in orthogonal to the fiber array optical axis direction. The fiber array calibration is completed when the calibration signals { } and their derivatives { } for all fiber array subapertures are recorded. When the fiber array is calibrated the calibration assembly can be removed.

Methods for mitigation of unsensed piston phase aberrations and near-field phasing of coherent fiber array systems: The method of the coherent fiber array system near-field (exit plane) phasing with simultaneous mitigation of unsensed by BTI sensors piston phase aberrations as disclosed herein is based on feedback control of the MOPA system's (500) phase shifters (509) by minimizing one or another sort of metric signals. These metric signals are dependent on difference between the measured by the network of BTI sensors signals and, and the corresponding calibration signals { } and { } that are preliminary recorded during the fiber array calibration described above. The metrics are computed by the near-field phasing processor (1802) in FIG. 24. Exemplary metrics that can be used for beamlets phasing with mitigation of unsensed piston phase aberrations may include but not limited to, where { } are deviations of the measured signals { } in respect to small perturbation of control voltages { } applied to the phase shifters. The signals { } or dependent on these signal expressions that preserve deviations sign e.g. {sign} could be obtained simultaneously with metrics optimization.

Dependent on the control algorithm used, the beamlets' phasing processor (509.1) may be composed of a single processor optimizing a single metric K(t), e.g. a cumulative sum of metrics, or a set of independently operating processors optimizing individual metrics. This metric(s) optimization can be based on known techniques that may include but are not limited to gradient descent, SPGD, decoupled SPGD, multi-dithering, simulated annealing, etc.

For performance improvement (e.g. SNR increase and phasing error decrease) of the control systems during both fiber array system calibration and phasing, an additional small amplitude dithering piston phase modulation signals and synchronous detection technique can be applied to either one or more phase shifters (509) and/or (510) as described above and illustrated in FIG. 26 and FIG. 27. In this case beamlets phasing with compensation of unsensed piston phase aberrations can be achieved via optimization of metrics dependent on signals, and, obtained from synchronous detection of the measured with the BTI sensors signals $\{J_{j,k}(t)\}$ and { }. Independent of metrics used and choices for their optimization algorithm, the disclosed methods of the coherent fiber array system near-field phasing with simultaneous mitigation of unsensed by BTI sensors piston phase aberrations, results in stabilization of beamlets piston phases corresponding to the following conditions for the measured signals and their derivatives. This piston phase stabilization condition is illustrated in FIG. 28 where the control system provides locking of the measured signal at the calibration signal value—point $A^{cal}$ on the calibration curve (2801). At point $A^{cal}$ the sign of the measured signal derivative coincides with the sign of the corresponding calibration signal what allows distinguish two points ($A^{cal}$ and $B^{cal}$) having equal values of the measured signal.

Figure 29:
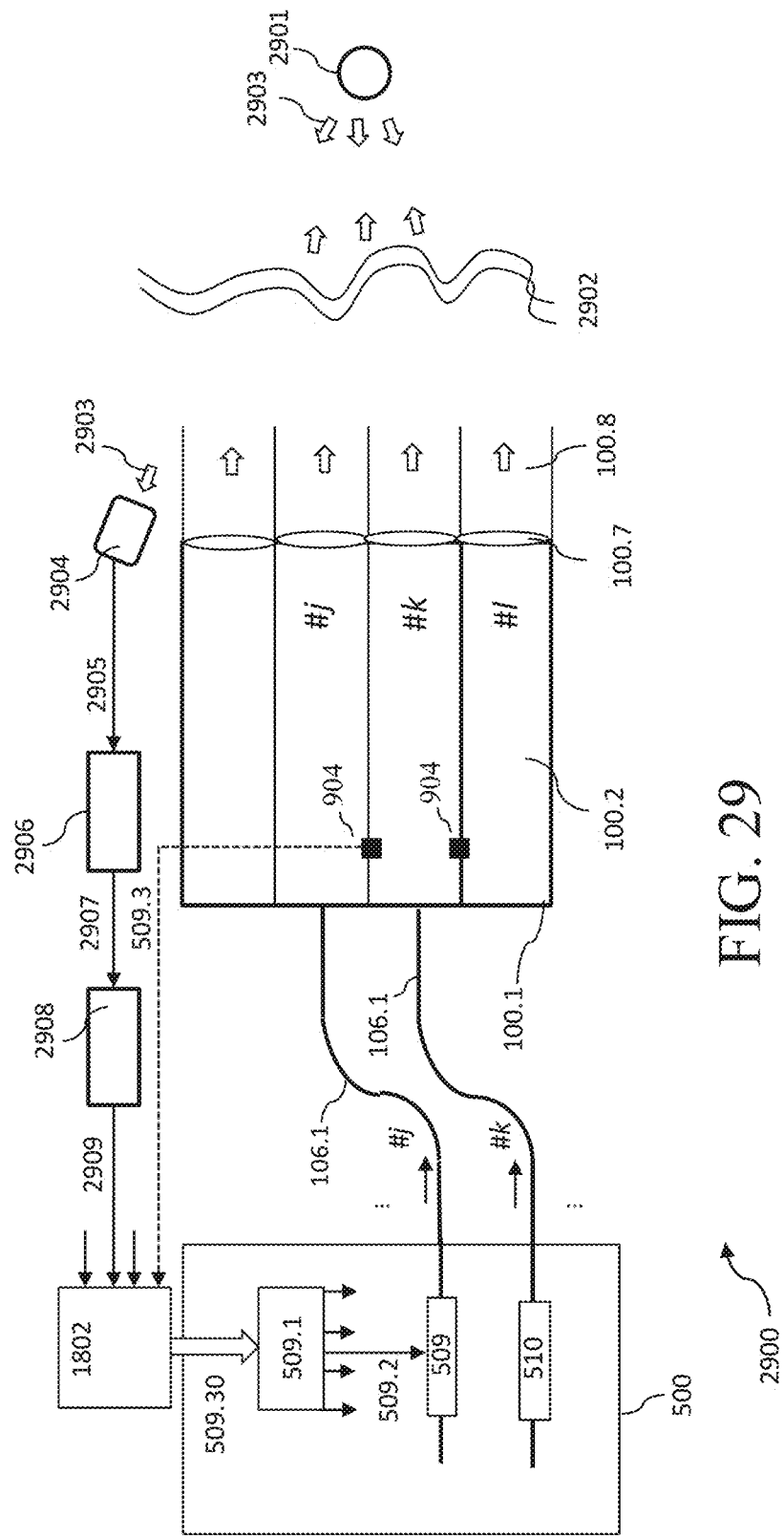
FIG. 29 is a schematic diagram of an exemplary coherent fiber array system of the present disclosure configured to simultaneously perform near-field and target-plane beamlets phasing.

Methods for combining near-field and target-plane beamlets phasing in coherent fiber array systems: FIG. 29 illustrates the disclosed herein method of coherent fiber array system phasing with simultaneous mitigation of the MOPA-induced phase noise, unsensed by BTI sensors piston phase aberrations, and adaptive pre-compensation of the propagation medium-induced phase distortions that prevent beamlets coherent combining at a remotely located target, exemplary using two adjacent (#k and #j) subapertures (100.2) of the fiber array laser head (100.1).

The beamlets (100.8) emitted by the fiber array laser head propagate to a remotely located target (2901) through a phase distorting medium (2902). The scattered off the target backscatter light (2903) propagates back and enters a target-in-the-loop (TIL) sensor (2904) such as, for example, the power-in-the-bucket (PIB) sensor that measures optical power of the backscattered light inside its optical receiver aperture. The measured signal (2905) is processed by the IL metric processor (2906) that computes TIL metric signal (2907) characterizing quality of beamlets phasing (quality of coherent beam combining) at the target also referred to as target plane phasing. Based on the TIL metric signal, the metric optimization controller (2908) computes control signals (2909) { } that may be required for mitigation of the propagation medium-induced piston phase aberrations of the beamlets along their propagation paths from the fiber array laser head to the target. The TIL metric controller could be based on but not limited to such control techniques as multi-dithering, LOCSET, SPGD, etc. The control signals (2909) computed by the TIL controller (2908) enter the signal processing module (1802). This signal processing module also receives the signals measured by the BTI sensors $\{J_{j,k}(t)\}$ (509.3) and computes their derivatives $\{\delta J_{j,k}(t)\}$. The signal processing module (1802) has also access to signals { } and { } and dependences of the measured by BIN sensors signals $\{J_{j,k}\}$ on the corresponding control voltages $\{u_j\}$ applied to phase shifters (509) of the MOPA system (500) referred to as the discrimination curves (2801) as illustrated in FIG. 28. The discrimination curves (2801) and the calibration signals { } and { } are preliminary recorded during the fiber array calibration described above. Using the calibrations curves as a lookup table one can compute the corresponding calibration voltages that could be applied to provide mitigation of unsensed by the BTI sensors piston phase aberrations. The signal processing module (1802) has assess to the calibration signal values. Using available calibration signals, control signals (2909) { } that may be required for pre-compensation of the propagation medium-induced piston phase aberrations, and the discrimination lookup tables, the signal processing module (1802) computes the desired values of the BTI sensors signals (509.30) { } and their derivatives { } (TIL-signals). These signals are used by the phase locking controllers (509.1) to generate control voltages (509.2) applied to the phase shifters (509) of the MOPA system (500). The phase locking controllers (509.1) may apply the algorithms similarly as in the methods for mitigation of unsensed aberrations described above with substitution of the calibration signals { } and by the corresponding TIL signals. With reference to an exemplary calibration curve in FIG. 28, this corresponds to piston phase control stabilizing the measured by BTI sensor signal at a point $A^{TIL}$.

What is claimed is:

1. A system for projecting laser power on a remotely located target, the system comprising:
   a coherent master oscillator power amplifier fiber (MOPA) system providing a plurality of laser beams on a plurality of fiber channels;
   a fiber array laser head including a plurality of subapertures positioned adjacent one another, each subaperture configured to transmit a beamlet portion of the laser beam transmitted through the subaperture from a corresponding one of the fiber channels, a peripheral portion of each subaperature configured to not transmit a beam tail portion of the laser beam through the subaperture;
   a plurality of sensors positioned to receive laser light associated with the plurality of laser beams provided by the MOPA system and configured to produce a set of sensor signals based upon the received laser light; and
   a control system configured to generate a set of control signals based upon the set of sensor signals, wherein the set of control signals is configured to cause the MOPA system to modulate characteristics of the plurality of laser beams, wherein the control system at least includes a phase locking controller configured to control wavefront piston phases of a plurality of the beamlet portions to converge towards a phase locking condition under which wavefront piston phases of the beamlet portions are either equal or differ by $2\pi n$ radians, where n is an integer number,
   wherein the control system further comprises one or more of:
   a polarization state controller configured to mutually co-align polarization states of the plurality of the beamlet portions in time;
   an angular co-alignment controller configured to mutually co-align the transmission angles of the plurality of beamlet portions in time;
   an optical path matching controller configured to mutually equalize optical carrier frequencies of the plurality of the beamlet portions in time;
   one or more first controllers configured to operate in a pre-defined sequential order to provide all or some characteristics of the plurality of beamlet portions in time;
   a second controller configured to provide mitigation of non-common path piston phase aberrations; and
   a third controller configured to provide pre-defined mutual stabilization of wavefront piston phases of the plurality of beamlets in time.

2. The system of claim 1, wherein the control system further comprises:
   another controller configured to control wavefront piston phases of the plurality of the beamlet portions, originated from the plurality of the laser beams transmitted through the subapertures by the fiber array laser head at the remotely located target, to converge towards the phase locking condition at the remotely located target.

3. The system of claim 1, wherein at least some of the plurality of sensors are positioned to receive the laser light scattered off the remotely located target struck by the plurality of beamlet portions.

4. The system of claim 1, wherein the control system is configured to generate the control signals to control characteristics of each of the plurality of beamlet portions to include a configured pointing angle, an optical carrier frequency, a polarization state, and a piston phase.

5. The system of claim 1, wherein the plurality of sensors includes a beam tail polarization sensor positioned within one or more of the beam tail portions of the plurality of laser beams, the beam tail polarization sensor comprising:
   a linear polarizer configured to transmit through it a variable light power to the photo-detector that correlates to polarization states of the one or more corresponding laser beams; and
   a photodetector configured to produce a signal based on the variable light power,
   wherein the control system is further configured to:
   (i) correlate the signal to a polarization difference between the corresponding laser beams; and
   (ii) generate the set of control signals, based on the signal correlated to the polarization difference, to mitigate the polarization state difference.

6. The system of claim 1, wherein the fiber array laser head includes a plurality of optical path length adjusters configured to selectively increase and decrease a length of the optical paths of the plurality of laser beams based on the set of control signals computed based on signals measured by a network of beam tail interference sensors for the sensors to control the optical carrier frequencies for the plurality of laser beams.

7. The system of claim 1, wherein the control system, when generating the set of control signals, performs a sequenced set of phases including:
(a) a first phase generating the set of control signals configured to achieve angular co-alignment of the plurality of beamlet portions;
(b) a second phase generating the set of control signals configured to achieve polarization locking of the plurality of beamlet portions;
(c) a third phase generating the set of control signals configured to achieve optical path matching of the plurality of beamlet portions; and
(d) a fourth phase generating the set of control signals configured to achieve piston phase locking of the plurality of beamlet portions.

8. The system of claim 1, further comprising one or more target-in-the-loop (TIL) sensors positioned to receive backscatter light from the plurality of beamlet portions striking the remotely located target and configured to generate a power signal based on the optical power of the backscatter light, wherein the control system is configured to:
(a) determine a quality of coherent combining at the remotely located target for the plurality of beamlet portions based upon the power signal; and
(b) generate the set of control signals, based further on the determined quality of coherent combining based on signals received from the one or more TIL sensors, calibration signals, and signals measured by a network of beam tail interference (BTI) sensor for the sensors to provide convergence towards coherent combining at the remote located target, to simultaneously:
(i) mitigate MOPA-induced phase noise for the plurality beamlet portions;
(ii) mitigate unsensed piston phase aberrations for the plurality of beamlet portions, wherein the unsensed piston phase aberrations are invisible to the plurality of sensors integrated into the fiber array; and
(iii) adaptively pre-compensate the plurality of beamlet portions for propagation medium induced phase distortions.

9. A system for projecting laser power on a remotely located target, the system comprising:
a coherent master oscillator power amplifier fiber (MOPA) system providing a plurality of laser beams on a plurality of fiber channels;
a fiber array laser head including a plurality of subapertures positioned adjacent one another, each subaperture configured to transmit a beamlet portion of the laser beam transmitted through the subaperture from a corresponding one of the fiber channels, a peripheral portion of each subaperature configured to not transmit a beam tail portion of the laser beam through the subaperture;
a plurality of sensors positioned to receive laser light associated with the plurality of laser beams provided by the MOPA system and configured to produce a set of sensor signals based upon the received laser light; and
a control system configured to generate a set of control signals based upon the set of sensor signals, wherein the set of control signals is configured to cause the MOPA system to modulate characteristics of the plurality of laser beams, wherein the control system at least includes a phase locking controller configured to control wavefront piston phases of a plurality of the beamlet portions to converge towards a phase locking condition under which wavefront piston phases of the beamlet portions are either equal or differ by $2\pi n$ radians, where n is an integer number,
wherein at least a subset of the plurality of sensors are integrated into the fiber array laser head and are positioned to receive the laser light of a plurality of the beam tail portions of the plurality of laser beams.

10. The system of claim 9, wherein the control system further comprises one or more of:
a polarization state controller configured to mutually co-align polarization states of the plurality of the beamlet portions in time;
an angular co-alignment controller configured to mutually co-align the transmission angles of the plurality of beamlet portions in time;
an optical path matching controller configured to mutually equalize optical carrier frequencies of the plurality of the beamlet portions in time;
one or more first controllers configured to operate in a pre-defined sequential order to provide all or some characteristics of the plurality of beamlet portions in time;
a second controller configured to provide mitigation of non-common path piston phase aberrations; and
a third controller configured to provide pre-defined mutual stabilization of wavefront piston phases of the plurality of beamlets in time.

11. The system of claim 9, wherein the subset comprises one or more of: a beam tail interference (BTI) sensor; a beam tail polarization (BTP) sensor; a combined BTI and BTP sensor; a beamlet angular co-alignment sensor; an optical path matching sensor; and a sensor measuring characteristics of backscattered light returned from the remotely located target.

12. A system for projecting laser power on a remotely located target, the system comprising:
a coherent master oscillator power amplifier fiber (MOPA) system providing a plurality of laser beams on a plurality of fiber channels;
a fiber array laser head including a plurality of subapertures positioned adjacent one another, each subaperture configured to transmit a beamlet portion of the laser beam transmitted through the subaperture from a corresponding one of the fiber channels, a peripheral portion of each subaperature configured to not transmit a beam tail portion of the laser beam through the subaperture;
a plurality of sensors positioned to receive laser light associated with the plurality of laser beams provided by the MOPA system and configured to produce a set of sensor signals based upon the received laser light; and
a control system configured to generate a set of control signals based upon the set of sensor signals, wherein the set of control signals is configured to cause the MOPA system to modulate characteristics of the plurality of laser beams, wherein the control system at least includes a phase locking controller configured to control wavefront piston phases of a plurality of the beamlet portions to converge towards a phase locking condition under which wavefront piston phases of the beamlet portions are either equal or differ by $2\pi n$ radians, where n is an integer number,
wherein at least some of the plurality of sensors are positioned either inside or outside the fiber array laser head to receive the laser light of the plurality of laser beams or the beamlet portions.

13. A system for projecting laser power on a remotely located target, the system comprising:
- a coherent master oscillator power amplifier fiber (MOPA) system providing a plurality of laser beams on a plurality of fiber channels;
- a fiber array laser head including a plurality of subapertures positioned adjacent one another, each subaperture configured to transmit a beamlet portion of the laser beam transmitted through the subaperture from a corresponding one of the fiber channels, a peripheral portion of each subaperature configured to not transmit a beam tail portion of the laser beam through the subaperture;
- a plurality of sensors positioned to receive laser light associated with the plurality of laser beams provided by the MOPA system and configured to produce a set of sensor signals based upon the received laser light; and
- a control system configured to generate a set of control signals based upon the set of sensor signals, wherein the set of control signals is configured to cause the MOPA system to modulate characteristics of the plurality of laser beams, wherein the control system at least includes a phase locking controller configured to control wavefront piston phases of a plurality of the beamlet portions to converge towards a phase locking condition under which wavefront piston phases of the beamlet portions are either equal or differ by $2\pi n$ radians, where n is an integer number, wherein the plurality of sensors includes a beam tail interference sensor positioned proximate to a center of an overlap region of a pair of the beam tail portions corresponding to first and second adjacent ones of the subapertures, wherein the beam tail interference sensor comprises:
- a transmissive amplitude grating configured to transmit a variable light power therethrough dependent on mutual piston phases of the corresponding laser beams; and
- a photodetector configured to receive the variable light power and produce a signal based on the variable light power;
- wherein the control system is further configured to:
  - (i) correlate the signal to a piston phase difference between the corresponding laser beams; and
  - (ii) generate the set of control signals, based on the signal correlated to the piston phase difference, to mitigate the piston phase difference.

14. The system of claim 13, wherein the beam tail interference sensor further comprises:
- a linear polarizer configured to transmit the variable light power that is dependent on a polarization state of the corresponding laser beam, and
- one or more photodetectors configured to receive the variable light power and produce a signal based on the variable light power,
- wherein the control system is further configured to:
  - (i) correlate the signal to the piston phase difference and a polarization state difference between the pair of beamlet portions; and
  - (ii) generate the set of control signals, based on the signal correlated to the piston phase difference and the polarization state difference, to mitigate the piston phase difference and the polarization state difference.

15. A system for projecting laser power on a remotely located target, the system comprising:
- a coherent master oscillator power amplifier fiber (MOPA) system providing a plurality of laser beams on a plurality of fiber channels;
- a fiber array laser head including a plurality of subapertures positioned adjacent one another, each subaperture configured to transmit a beamlet portion of the laser beam transmitted through the subaperture from a corresponding one of the fiber channels, a peripheral portion of each subaperature configured to not transmit a beam tail portion of the laser beam through the subaperture;
- a plurality of sensors positioned to receive laser light associated with the plurality of laser beams provided by the MOPA system and configured to produce a set of sensor signals based upon the received laser light; and
- a control system configured to generate a set of control signals based upon the set of sensor signals, wherein the set of control signals is configured to cause the MOPA system to modulate characteristics of the plurality of laser beams, wherein the control system at least includes a phase locking controller configured to control wavefront piston phases of a plurality of the beamlet portions to converge towards a phase locking condition under which wavefront piston phases of the beamlet portions are either equal or differ by $2\pi n$ radians, where n is an integer number, wherein the plurality of sensors includes a beam tail interference sensor comprising:
- a reflective diffractive grating positioned proximate to a center of an overlap region of a pair of the beam tail portions corresponding to first and second adjacent ones of the subaperture, wherein the reflective diffractive grating is configured to reflect a diffracted pair of the beam tail portions across a distance towards a location;
- an optical system disposed at the location and configured to receive the diffracted pair of the beam tail portions, the optical system configured to transmit a variable light power dependent on one or more of piston phases, or polarization states of the corresponding laser beams;
- a photo-detector configured to receive the variable light power and produce a signal based on the variable light power;
- wherein the control system is further configured to:
  - (i) correlate the signal to one or more of a piston phase difference, a polarization state difference, or an optical carrier frequency difference between the corresponding laser beams; and
  - (ii) generate the set of control signals, based on the signal correlated to one or more of the piston phase difference, the polarization state difference, or the optical carrier frequency difference, to mitigate one or more of the piston phase difference, the polarization state difference, or the optical carrier frequency difference.

16. The system of claim 15, further comprising a coherent fiber bundle, wherein:
- (a) the photo-detector is positioned outside the fiber array laser head;
- (b) the optical system is positioned at least partially within the fiber array laser head, and is configured to transmit the variable light power to the coherent fiber bundle; and
- (c) a first end of the coherent fiber bundle is positioned to receive the variable light power, and a second end of the coherent fiber bundle is positioned to provide the variable light power to the photo-detector outside the fiber array laser head.

17. The system of claim 1, wherein the fiber array laser head includes a plurality of angular alignment modules configured to control an angular propagation direction for the plurality of beamlet portions in response to the set of control signals, and wherein the control system is configured to generate the set of control signals to cause the angular alignment modules to provide convergence towards overlapping of footprints of the plurality of beamlet portions at the remotely located target.

18. The system of claim 17, wherein each angular alignment module is configured to displace a fiber tip, an optical element, or both to control the angular propagation direction of the plurality of beamlet portions.

19. The system of claim 1, further comprising a calibration module that includes:
- an optical system configured to focus two or more of the plurality of beamlets into a common focus on a point;
- a pinhole positioned at the point; and
- a photo-detector positioned to receive light through the pinhole and generate a set of signals;

wherein the control system is configured to:
  (i) control wavefront piston phases of a plurality of the beamlet portions originated from the plurality of laser beams transmitted through by the fiber array laser head and the calibration optical system to converge towards a phase locking condition under which wavefront piston phases of the beamlet portions are either equal or differ by $2\pi n$ radians, where n is an integer number;
  (ii) identify any unsensed piston phase aberrations based on the set of signals, wherein the unsensed piston phase aberrations are invisible to the plurality of sensors integrated into fiber array;
  (iii) determine a set of calibration signals based on the identified unsensed piston phase aberrations; and
  (iv) generate the set of controls based on the set of calibration signals and the set of sensor signals and record the set of the measured calibration signals.

20. A coherent laser power projection system, comprising:
- a fiber array laser head including a plurality of subapertures, wherein the plurality of subapertures includes at least a first subaperture and a second subaperture positioned adjacent to the first subaperture;
- a laser power system configured to provide laser power to the fiber array laser head and configured to produce a set of laser beams, wherein each laser beam of the set of laser beams includes a beamlet portion that is transmitted from a corresponding one of the subapertures and includes a beam tail portion that is not transmitted from the corresponding one of the subapertures;
- a sensing system coupled with the fiber array laser head and designed to measure one or more characteristics of the set of beamlet portions;
- a laser power system controller configured to produce control signals based on signals received from the sensing system to operate the laser power system, the laser power system controller configured to produce the set of laser beams that cause a set of coherently combined beamlet portions to be transmitted from the fiber array laser head; and
- a beam tail interference sensor positioned at a center of an overlap region of a pair of the beam tail portions from a pair of the laser beams corresponding to the first subaperture and the second subaperture, the beam tail interference sensor including an amplitude grating and a photodetector, wherein:
  (i) the amplitude grating is configured to transmit a variable light to the photodetector based on piston phases of the pair of laser beams; and
  (ii) the photo-detector is configured to produce a signal based on the variable light; and wherein the laser power system controller is configured to:
  (i) provide a first set of control signals to the laser power system;
  (ii) use the signal as a periodic function of a piston phase difference between the pair of laser beams while providing the first set of control signals;
  (iii) create a second set of controls signals, based on the signal as the periodic function of the piston phase difference, to mitigate the piston phase difference; and
  (iv) provide the second set of control signals to the laser power system.

* * * * *